(12) United States Patent
Kim et al.

(10) Patent No.: US 11,432,251 B2
(45) Date of Patent: Aug. 30, 2022

(54) METHOD FOR TRANSMITTING SYNCHRONIZATION SIGNAL IN WIRELESS COMMUNICATION SYSTEM AND APPARATUS THEREFOR

(71) Applicant: LG Electronics Inc., Seoul (KR)

(72) Inventors: Youngsub Kim, Seoul (KR); Hyunsoo Ko, Seoul (KR); Kijun Kim, Seoul (KR); Sukhyon Yoon, Seoul (KR); Changhwan Park, Seoul (KR)

(73) Assignee: LG Electronics Inc., Seoul (KR)

( * ) Notice: Subject to any disclaimer, the term of this patent is extended or adjusted under 35 U.S.C. 154(b) by 387 days.

(21) Appl. No.: 16/491,087

(22) PCT Filed: Mar. 2, 2018

(86) PCT No.: PCT/KR2018/002528
§ 371 (c)(1),
(2) Date: Sep. 4, 2019

(87) PCT Pub. No.: WO2018/164420
PCT Pub. Date: Sep. 13, 2018

(65) Prior Publication Data
US 2020/0015177 A1  Jan. 9, 2020

Related U.S. Application Data

(60) Provisional application No. 62/506,603, filed on May 15, 2017, provisional application No. 62/471,376, (Continued)

(51) Int. Cl.
*H04W 56/00* (2009.01)
*H04L 27/26* (2006.01)
*H04W 88/08* (2009.01)

(52) U.S. Cl.
CPC ....... *H04W 56/001* (2013.01); *H04L 27/2605* (2013.01); *H04L 27/2636* (2013.01); *H04W 88/08* (2013.01)

(58) Field of Classification Search
None
See application file for complete search history.

(56) References Cited

U.S. PATENT DOCUMENTS 8,660,201 B2  2/2014  Moon et al.
9,584,244 B2  2/2017  Han et al.
(Continued)

FOREIGN PATENT DOCUMENTS

CN  101155164  4/2008
CN  103379082  10/2013
(Continued)

OTHER PUBLICATIONS

CN Office Action in Chinese Appln. No. 201880012538.0, dated Jun. 7, 2021, 15 pages (with English translation).
(Continued)

*Primary Examiner* — Christopher T Wyllie
(74) *Attorney, Agent, or Firm* — Fish & Richardson P.C.

(57) ABSTRACT

Disclosed is a method for transmitting a primary synchronization signal (PSS) by a base station in a wireless communication system. In particular, the method may comprise the steps of: dividing one symbol into multiple periods; generating multiple sequences for the PSS, the number of which is identical to the number of the multiple periods; and mapping the multiple sequences to the one symbol divided into the multiple periods, and transmitting the multiple sequences.

6 Claims, 18 Drawing Sheets

Related U.S. Application Data filed on Mar. 15, 2017, provisional application No. 62/467,099, filed on Mar. 4, 2017.

(56) References Cited

U.S. PATENT DOCUMENTS

| | | | |
|---|---|---|---|
| 2008/0123616 A1* | 5/2008 | Lee | H04L 5/0048 370/344 |
| 2010/0110873 A1* | 5/2010 | Han | H04L 27/2626 370/208 |
| 2013/0176952 A1* | 7/2013 | Shin | H04W 72/042 370/329 |
| 2015/0043694 A1* | 2/2015 | Cho | H04L 27/2626 375/354 |
| 2015/0180602 A1* | 6/2015 | Han | H04L 5/0007 370/208 |
| 2016/0094318 A1* | 3/2016 | Shattil | H04B 1/0003 375/267 |
| 2017/0223648 A1* | 8/2017 | Shin | H04W 56/005 |
| 2017/0373812 A1* | 12/2017 | Berggren | H04L 5/0053 |
| 2018/0123849 A1* | 5/2018 | Si | H04J 11/0076 |

FOREIGN PATENT DOCUMENTS

| | | |
|---|---|---|
| CN | 103763295 | 4/2014 |
| EP | 2152016 | 2/2010 |
| WO | WO2007083912 | 7/2007 |
| WO | WO2008134722 | 11/2008 |
| WO | WO2016141992 | 9/2016 |
| WO | WO-2016184503 A1 * | 11/2016 ........... G06F 17/141 |

OTHER PUBLICATIONS

EP Office Action in European Appln. No. 18764211.1, dated Jun. 21, 2021, 6 pages.

Extended European Search Report in European Application No. 18764211.1, dated Nov. 20, 2020, 7 pages.

PCT International Search Report and Written Opinion in International Application No. PCT/KR2018/002528, dated Jun. 5, 2018, 28 pages (with English translation).

* cited by examiner

FIG. 1
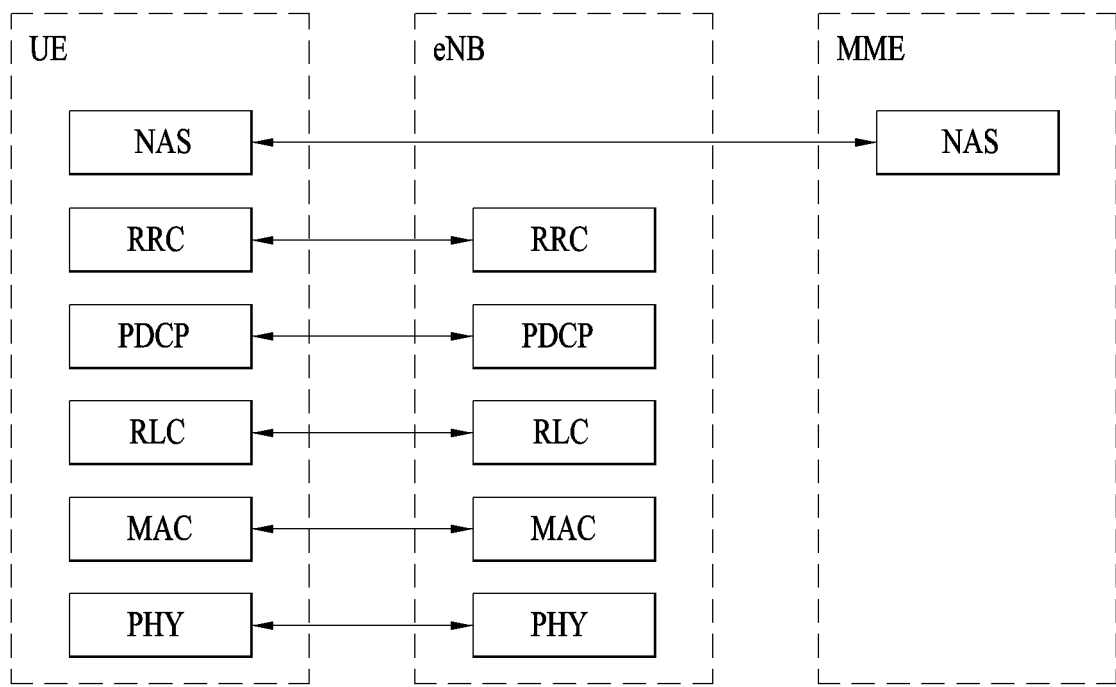
(A) CONTROL-PLANE PROTOCOL STACK
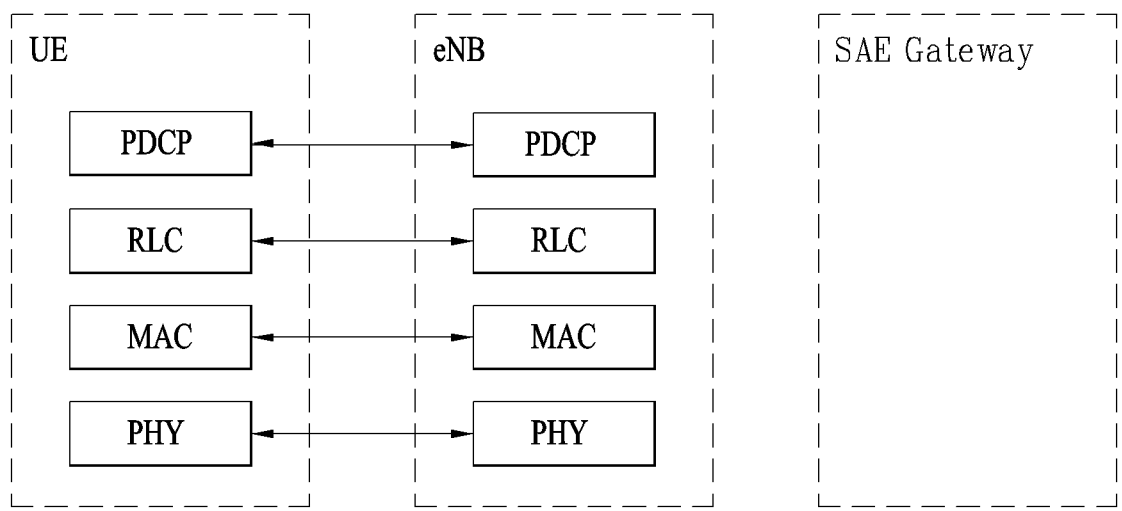
(B) USER-PLANE PROTOCOL STACK Legacy PSS    Suggest PSS FIG. 12
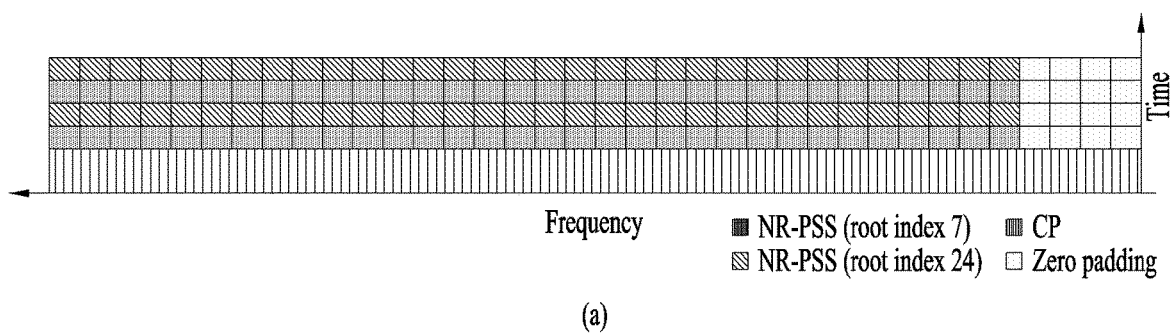
(a)
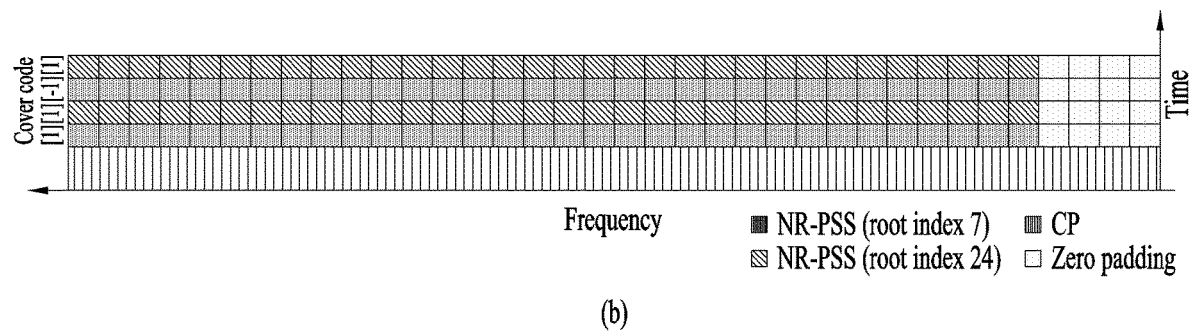
(b)

METHOD FOR TRANSMITTING SYNCHRONIZATION SIGNAL IN WIRELESS COMMUNICATION SYSTEM AND APPARATUS THEREFOR

CROSS-REFERENCE TO RELATED APPLICATIONS

This application is a National Stage application under 35 U.S.C. § 371 of International Application No. PCT/KR2018/002528, filed on Mar. 2, 2018, which claims the benefit of U.S. Provisional Application No. 62/506,603, filed on May 15, 2017, U.S. Provisional Application No. 62/471,376, filed on Mar. 15, 2017, and U.S. Provisional Application No. 62/467,099, filed on Mar. 4, 2017. The disclosures of the prior applications are incorporated by reference in their entirety.

TECHNICAL FIELD

The present invention relates to a method of transmitting a synchronization signal in a wireless communication system and apparatus therefor, and more particularly, to a method of generating and deploying a sequence of a primary synchronization signal configuring a synchronization signal and apparatus therefor.

BACKGROUND ART

As more and more communication devices demand greater communication traffic as times go by, the next generation 5G system, which is wireless broadband communication, is being required over the existing LTE systems. In the next generation 5G system named NewRAT, communication scenarios are classified into Enhanced Mobile BroadBand (eMBB), Ultra-reliability and low-latency communication (URLLC), Massive Machine-Type Communications (mMTC), etc.

Here, eMBB is the next generation mobile communication scenario having such properties as High Spectrum Efficiency, High User Experienced Data Rate, High Peak Data Rate and the like, URLLC is the next generation mobile communication scenario having such properties as Ultra Reliable, Ultra Low Latency, Ultra High Availability and the like (e.g., V2X, Emergency Service, Remote Control), and mMTC is the next generation mobile communication scenario having such properties as Low Cost, Low Energy, Short Packet, Massive Connectivity and the like (e.g., IoT).

DISCLOSURE OF THE INVENTION

Technical Task

One technical task of the present invention is to provide a method of transmitting a synchronization signal and apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

In one technical aspect of the present invention, provided herein is a method of transmitting a Primary Synchronization Signal (PSS) by a base station in a wireless communication system, the method including dividing a single symbol into a plurality of durations, generating a plurality of sequences, of which number is equal to a number of a plurality of the durations, for the PSS, and transmitting a plurality of the sequences in a manner of mapping a plurality of the sequences to the single symbol divided into a plurality of the durations.

Here, a plurality of the sequences may be mapped to a plurality of the durations, respectively.

A plurality of the sequences may be mapped to a subcarrier with the same spacing as the number of a plurality of the durations.

Odd sequences among a plurality of the sequences may use a same first sequence and even sequences among a plurality of the sequences may use a same second sequence.

The first sequence and the second sequence may have conjugate complex relation.

The symbol divided into a plurality of the durations may include a single Cyclic Prefix (CP).

A plurality of the sequences may be mapped to the symbol using a cover code for a plurality of the durations.

Each of a plurality of the sequences may have a length amounting to a half of the subcarrier number included in each of a plurality of the durations, be mapped to an even subcarrier, and process a DC subcarrier by nulling.

Each of a plurality of the sequences may have a length amounting to a half of the subcarrier number included in each of a plurality of the durations and be mapped to an even subcarrier in a manner of skipping a DC subcarrier.

And, the transmitting a plurality of the sequences in a manner of mapping a plurality of the sequences may include concatenating a plurality of the sequences, performing Discrete Fourier Transform (DFT) spreading on a plurality of the concatenated sequences, and transmitting a plurality of the DFT-spread sequences in a manner of mapping a plurality of the DFT-spread sequences to a plurality of the durations.

In another technical aspect of the present invention, provided herein is a base station transmitting a Primary Synchronization Signal (PSS) in a wireless communication system, the base station including an RF module transceiving a wireless signal with a user equipment and a processor configured to divide a single symbol into a plurality of durations, generate a plurality of sequences, of which number is equal to a number of a plurality of the durations, for the PSS, and transmit a plurality of the sequences through the RF module in a manner of mapping a plurality of the sequences to the single symbol divided into a plurality of the durations.

In further technical aspect of the present invention, provided herein is a method of receiving a Primary Synchronization Signal (PSS) by a user equipment in a wireless communication system, the method including receiving the PSS configured with a plurality of sequences mapped to a single symbol from a base station and determining a cell group corresponding to the PSS based on a plurality of the sequences, wherein a plurality of the sequences are mapped to a plurality of durations divided within the single symbol and wherein the number of a plurality of the sequences is equal to that of a plurality of the durations.

Advantageous Effects

According to the present invention, through the Primary Synchronization Signal (PSS) design by the present invention, timing ambiguity due to Carrier Frequency Offset (CFO) can be reduced.

Moreover, through the PSS design, detection complexity at a User Equipment (UE) side can be reduced.

It will be appreciated by persons skilled in the art that that the effects that could be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

FIG. 1 is a diagram for structures of control and user planes of radio interface protocol between a 3GPP radio access network standard-based user equipment and E-UTRAN.

FIGS. 10 to 13 are diagrams to describe a primary synchronization signal sequence mapping and transmitting method according to an embodiment of the present invention.

BEST MODE FOR INVENTION

Figure 2:
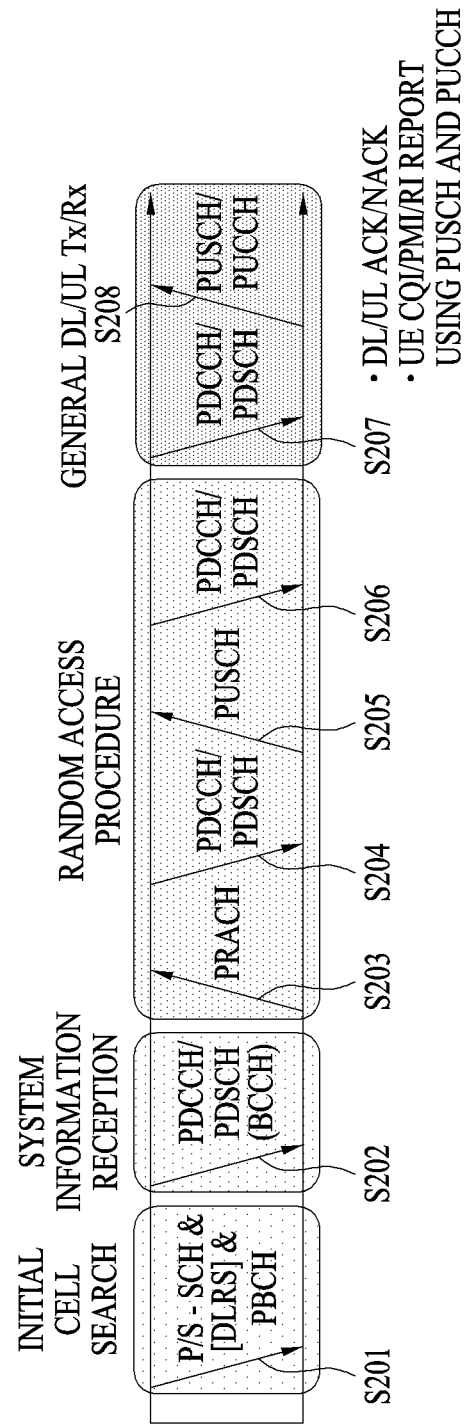
FIG. 2 is a diagram for explaining physical channels used for 3GPP system and a general signal transmission method using the physical channels.

The configuration, operation, and other features of the present disclosure will readily be understood with embodiments of the present disclosure described with reference to the attached drawings. Embodiments of the present disclosure as set forth herein are examples in which the technical features of the present disclosure are applied to a 3rd Generation Partnership Project (3GPP) system.

While embodiments of the present disclosure are described in the context of Long Term Evolution (LTE) and LTE-Advanced (LTE-A) systems, they are purely exemplary. Therefore, the embodiments of the present disclosure are applicable to any other communication system as long as the above definitions are valid for the communication system.

The term 'Base Station (BS)' may be used to cover the meanings of terms including Remote Radio Head (RRH), evolved Node B (eNB or eNode B), Reception Point (RP), relay, etc.

FIG. 1 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for Downlink (DL) and in Single Carrier Frequency Division Multiple Access (SC-FDMA) for Uplink (UL).

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

FIG. 2 illustrates physical channels and a general method for transmitting signals on the physical channels in the 3GPP system.

Referring to FIG. 2, when a UE is powered on or enters a new cell, the UE performs initial cell search (S201). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S202).

If the UE initially accesses the eNB or has no radio resources for signal transmission to the eNB, the UE may perform a random access procedure with the eNB (S203 to S206). In the random access procedure, the UE may transmit a predetermined sequence as a preamble on a Physical Random Access Channel (PRACH) (S203 and S205) and may receive a response message to the preamble on a PDCCH and a PDSCH associated with the PDCCH (S204 and S206). In the case of a contention-based RACH, the UE may additionally perform a contention resolution procedure.

After the above procedure, the UE may receive a PDCCH and/or a PDSCH from the eNB (S207) and transmit a Physical Uplink Shared Channel (PUSCH) and/or a Physical Uplink Control Channel (PUCCH) to the eNB (S208), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 3:
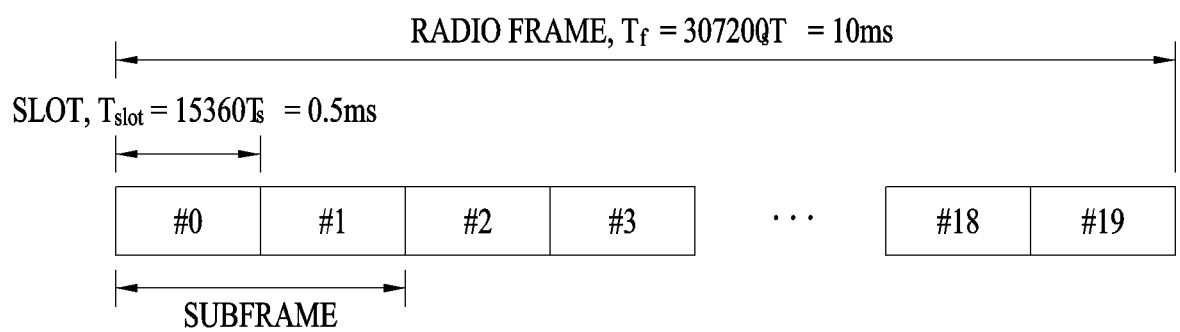
FIG. 3 is a diagram for a structure of a radio frame in LTE system.

FIG. 3 illustrates a structure of a radio frame used in the LTE system.

Referring to FIG. 3, a radio frame is 10 ms (327200×Ts) long and divided into 10 equal-sized subframes. Each subframe is 1 ms long and further divided into two slots. Each time slot is 0.5 ms (15360×Ts) long. Herein, Ts represents a sampling time and Ts=1/(15 kHz×2048)=3.2552×10−8 (about 33 ns). A slot includes a plurality of Orthogonal Frequency Division Multiplexing (OFDM) symbols or SC-FDMA symbols in the time domain by a plurality of Resource Blocks (RBs) in the frequency domain. In the LTE system, one RB includes 12 subcarriers by 7 (or 6) OFDM symbols. A unit time during which data is transmitted is defined as a Transmission Time Interval (TTI). The TTI may be defined in units of one or more subframes. The above-described radio frame structure is purely exemplary and thus the number of subframes in a radio frame, the number of slots in a subframe, or the number of OFDM symbols in a slot may vary.

Figure 4:
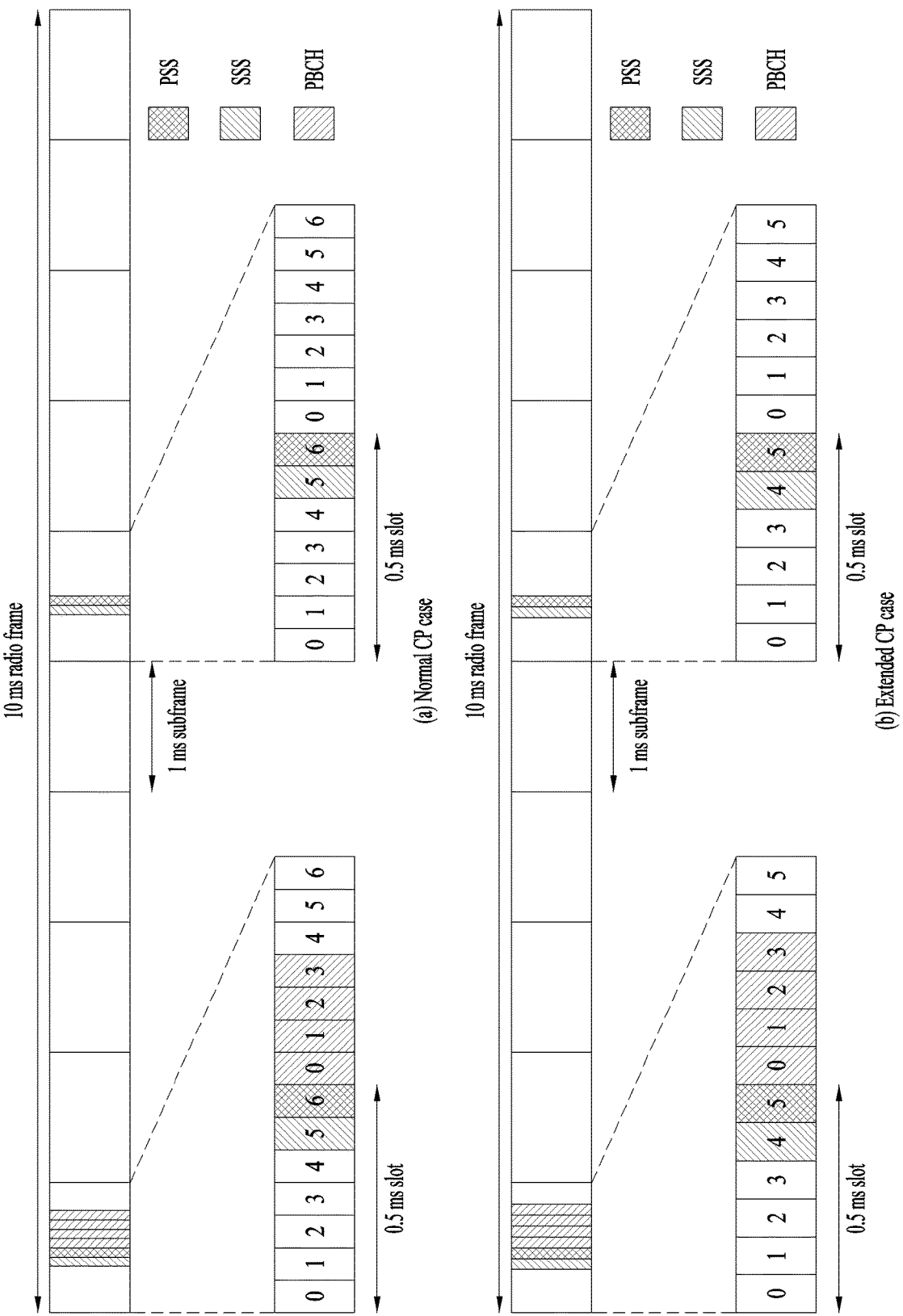
FIG. 4 is a diagram illustrating a radio frame structure for transmitting an SS (synchronization signal) in LTE system.

FIG. 4 is a diagram illustrating a radio frame structure for transmitting an SS (synchronization signal) in LTE system. In particular, FIG. 4 illustrates a radio frame structure for transmitting a synchronization signal and PBCH in FDD (frequency division duplex). FIG. 4 (a) shows positions at which the SS and the PBCH are transmitted in a radio frame configured by a normal CP (cyclic prefix) and FIG. 4 (b) shows positions at which the SS and the PBCH are transmitted in a radio frame configured by an extended CP.

An SS will be described in more detail with reference to FIG. 4. An SS is categorized into a PSS (primary synchronization signal) and an SSS (secondary synchronization signal). The PSS is used to acquire time-domain synchronization such as OFDM symbol synchronization, slot synchronization, etc. and/or frequency-domain synchronization. And, the SSS is used to acquire frame synchronization, a cell group ID, and/or a CP configuration of a cell (i.e. information indicating whether to a normal CP or an extended is used). Referring to FIG. 4, a PSS and an SSS are transmitted through two OFDM symbols in each radio frame. Particularly, the SS is transmitted in first slot in each of subframe 0 and subframe 5 in consideration of a GSM (Global System for Mobile communication) frame length of 4.6 ms for facilitation of inter-radio access technology (inter-RAT) measurement. Especially, the PSS is transmitted in a last OFDM symbol in each of the first slot of subframe 0 and the first slot of subframe 5. And, the SSS is transmitted in a second to last OFDM symbol in each of the first slot of subframe 0 and the first slot of subframe 5. Boundaries of a corresponding radio frame may be detected through the SSS. The PSS is transmitted in the last OFDM symbol of the corresponding slot and the SSS is transmitted in the OFDM symbol immediately before the OFDM symbol in which the PSS is transmitted. According to a transmission diversity scheme for the SS, only a single antenna port is used. However, the transmission diversity scheme for the SS standards is not separately defined in the current standard.

Referring to FIG. 4, by detecting the PSS, a UE may know that a corresponding subframe is one of subframe 0 and subframe 5 since the PSS is transmitted every 5 ms but the UE cannot know whether the subframe is subframe 0 or subframe 5. That is, frame synchronization cannot be obtained only from the PSS. The UE detects the boundaries of the radio frame in a manner of detecting an SSS which is transmitted twice in one radio frame with different sequences.

Having demodulated a DL signal by performing a cell search procedure using the PSS/SSS and determined time and frequency parameters necessary to perform UL signal transmission at an accurate time, a UE can communicate with an eNB only after obtaining system information necessary for a system configuration of the UE from the eNB.

The system information is configured with a master information block (MIB) and system information blocks (SIBs). Each SIB includes a set of functionally related parameters and is categorized into an MIB, SIB Type 1 (SIB1), SIB Type 2 (SIB2), and SIB3 to SIB8 according to the included parameters.

The MIB includes most frequently transmitted parameters which are essential for a UE to initially access a network served by an eNB. The UE may receive the MIB through a broadcast channel (e.g. a PBCH). The MIB includes a downlink system bandwidth (DL BW), a PHICH configuration, and a system frame number (SFN). Thus, the UE can explicitly know information on the DL BW, SFN, and PHICH configuration by receiving the PBCH. On the other hand, the UE may implicitly know information on the number of transmission antenna ports of the eNB. The information on the number of the transmission antennas of the eNB is implicitly signaled by masking (e.g. XOR operation) a sequence corresponding to the number of the transmission antennas to 16-bit CRC (cyclic redundancy check) used in detecting an error of the PBCH.

The SIB1 includes not only information on time-domain scheduling for other SIBs but also parameters necessary to determine whether a specific cell is suitable in cell selection. The UE receives the SIB1 via broadcast signaling or dedicated signaling.

A DL carrier frequency and a corresponding system bandwidth can be obtained by MIB carried by PBCH. A UL carrier frequency and a corresponding system bandwidth can be obtained through system information corresponding to a DL signal. Having received the MIB, if there is no valid system information stored in a corresponding cell, a UE applies a value of a DL BW included in the MIB to a UL bandwidth until system information block type 2 (SystemInformationBlockType2, SIB2) is received. For example, if the UE obtains the SIB2, the UE is able to identify the entire UL system bandwidth capable of being used for UL transmission through UL-carrier frequency and UL-bandwidth information included in the SIB2.

In the frequency domain, PSS/SSS and PBCH are transmitted irrespective of an actual system bandwidth in total 6 RBs, i.e., 3 RBs in the left side and 3 RBs in the right side with reference to a DC subcarrier within a corresponding OFDM symbol. In other words, the PSS/SSS and the PBCH are transmitted only in 72 subcarriers. Therefore, a UE is configured to detect or decode the SS and the PBCH irrespective of a downlink transmission bandwidth configured for the UE.

Having completed the initial cell search, the UE can perform a random access procedure to complete the accessing the eNB. To this end, the UE transmits a preamble via PRACH (physical random access channel) and can receive a response message via PDCCH and PDSCH in response to the preamble. In case of contention based random access, it may transmit additional PRACH and perform a contention resolution procedure such as PDCCH and PDSCH corresponding to the PDCCH.

Having performed the abovementioned procedure, the UE can perform PDCCH/PDSCH reception and PUSCH/PUCCH transmission as a general UL/DL signal transmission procedure.

The random access procedure is also referred to as a random access channel (RACH) procedure. The random access procedure is used for various usages including initial access, UL synchronization adjustment, resource allocation, handover, and the like. The random access procedure is categorized into a contention-based procedure and a dedicated (i.e., non-contention-based) procedure. In general, the contention-based random access procedure is used for performing initial access. On the other hand, the dedicated random access procedure is restrictively used for performing handover, and the like. When the contention-based random access procedure is performed, a UE randomly selects a RACH preamble sequence. Hence, a plurality of UEs can transmit the same RACH preamble sequence at the same time. As a result, a contention resolution procedure is required thereafter. On the contrary, when the dedicated random access procedure is performed, the UE uses an RACH preamble sequence dedicatedly allocated to the UE by an eNB. Hence, the UE can perform the random access procedure without a collision with a different UE.

The contention-based random access procedure includes 4 steps described in the following. Messages transmitted via the 4 steps can be respectively referred to as message (Msg) 1 to 4 in the present invention.

Step 1: RACH preamble (via PRACH) (UE to eNB)
Step 2: Random access response (RAR) (via PDCCH and PDSCH (eNB to)
Step 3: Layer 2/Layer 3 message (via PUSCH) (UE to eNB)
Step 4: Contention resolution message (eNB to UE)

On the other hand, the dedicated random access procedure includes 3 steps described in the following. Messages transmitted via the 3 steps can be respectively referred to as message (Msg) 0 to 2 in the present invention. It may also perform uplink transmission (i.e., step 3) corresponding to PAR as a part of the ransom access procedure. The dedicated random access procedure can be triggered using PDCCH (hereinafter, PDCCH order) which is used for an eNB to indicate transmission of an RACH preamble.

Step 0: RACH preamble assignment via dedicated signaling (eNB to UE)
Step 1: RACH preamble (via PRACH) (UE to eNB)
Step 2: Random access response (RAR) (via PDCCH and PDSCH) (eNB to UE)

After the RACH preamble is transmitted, the UE attempts to receive a random access response (RAR) in a preconfigured time window. Specifically, the UE attempts to detect PDCCH (hereinafter, RA-RNTI PDCCH) (e.g., a CRC masked with RA-RNTI in PDCCH) having RA-RNTI (random access RNTI) in a time window. If the RA-RNTI PDCCH is detected, the UE checks whether or not there is a RAR for the UE in PDSCH corresponding to the RA-RNTI PDCCH. The RAR includes timing advance (TA) information indicating timing offset information for UL synchronization, UL resource allocation information (UL grant information), a temporary UE identifier (e.g., temporary cell-RNTI, TC-RNTI), and the like. The UE can perform UL transmission (e.g., message 3) according to the resource allocation information and the TA value included in the RAR. HARQ is applied to UL transmission corresponding to the RAR. In particular, the UE can receive reception response information (e.g., PHICH) corresponding to the message 3 after the message 3 is transmitted.

A random access preamble (i.e. RACH preamble) consists of a cyclic prefix of a length of TCP and a sequence part of a length of TSEQ. The TCP and the TSEQ depend on a frame structure and a random access configuration. A preamble format is controlled by higher layer. The RACH preamble is transmitted in a UL subframe. Transmission of the random access preamble is restricted to a specific time resource and a frequency resource. The resources are referred to as PRACH resources. In order to match an index 0 with a PRB and a subframe of a lower number in a radio frame, the PRACH resources are numbered in an ascending order of PRBs in subframe numbers in the radio frame and frequency domain. Random access resources are defined according to a PRACH configuration index (refer to 3GPP TS 36.211 standard document). The RACH configuration index is provided by a higher layer signal (transmitted by an eNB).

In LTE/LTE-A system, subcarrier spacing for a random access preamble (i.e., RACH preamble) is regulated by 1.25 kHz and 7.5 kHz for preamble formats 0 to 3 and a preamble format 4, respectively (refer to 3GPP TS 36.211).

Figure 5:
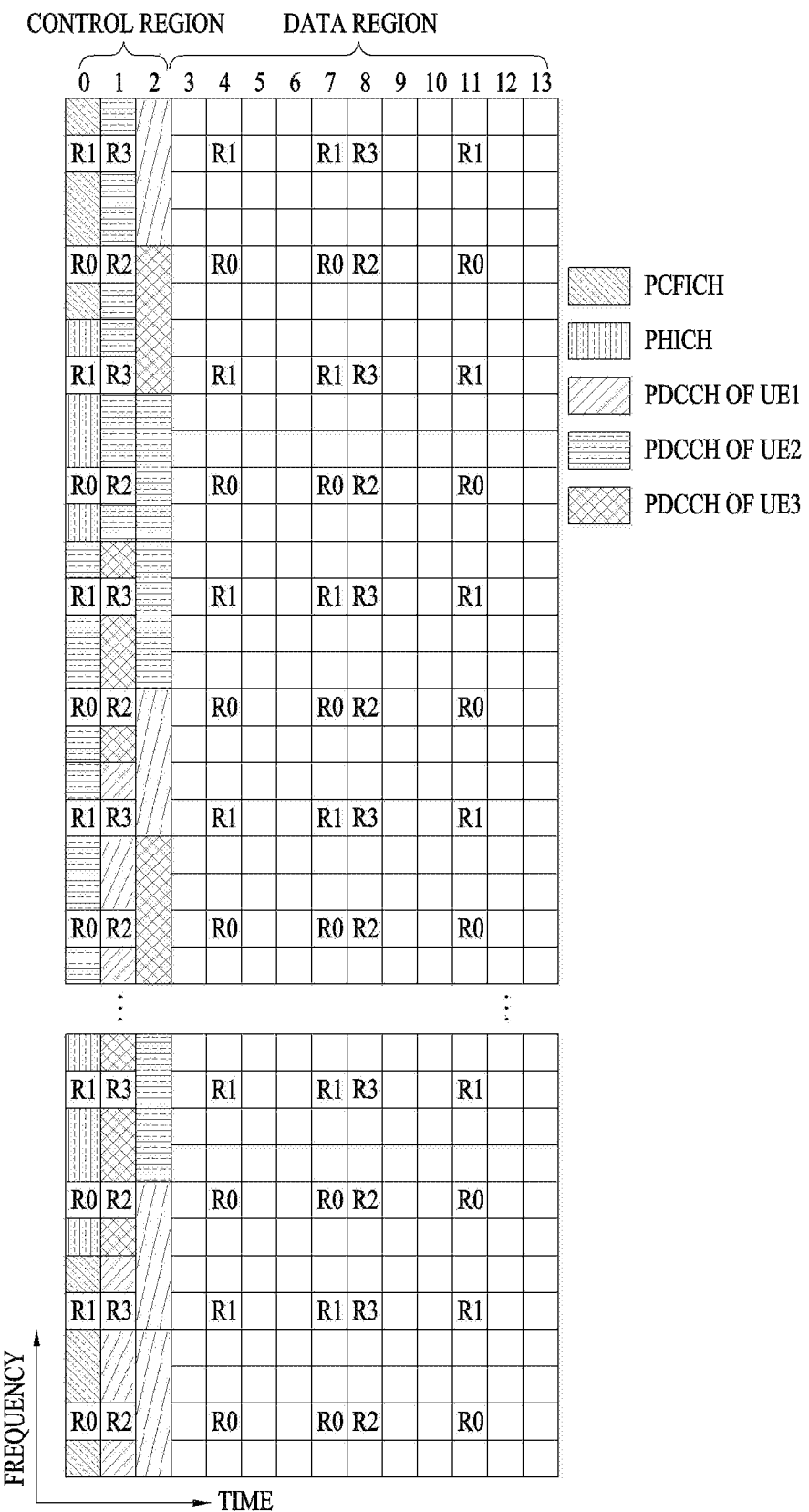
FIG. 5 illustrates a structure of a downlink radio frame in the LTE system.

FIG. 5 illustrates exemplary control channels included in a control region of a subframe in a DL radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3.

RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identity (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 6:
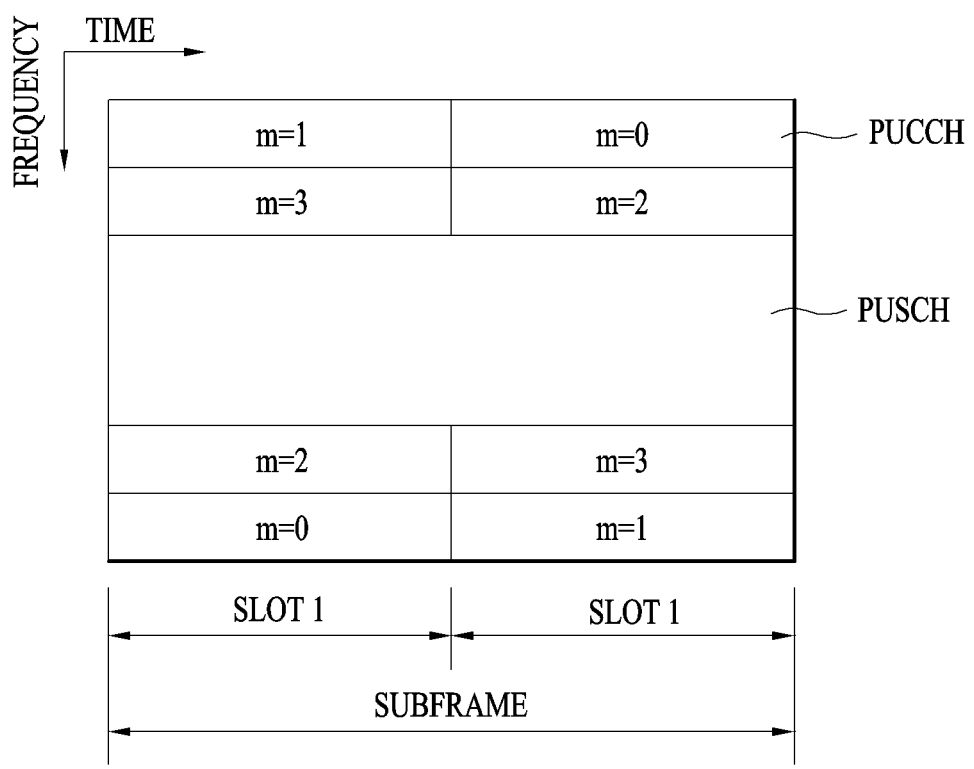
FIG. 6 illustrates a structure of an uplink subframe in the LTE system.

FIG. 6 illustrates a structure of a UL subframe in the LTE system.

Referring to FIG. 6, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for Multiple Input Multiple Output (MIMO), a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, and m=2 are allocated to a subframe in FIG. 6.

Hereinafter, channel state information (CSI) reporting will be described below. In the current LTE standard, there are two MIMO transmission schemes, open-loop MIMO operating without channel information and closed-loop MIMO operating with channel information. Particularly in the closed-loop MIMO, each of an eNB and a UE may perform beamforming based on CSI to obtain the multiplexing gain of MIMO antennas. To acquire CSI from the UE, the eNB may command the UE to feedback CSI on a downlink signal by allocating a PUCCH (Physical Uplink Control CHannel) or a PUSCH (Physical Uplink Shared CHannel) to the UE.

The CSI is largely classified into three information types, RI (Rank Indicator), PMI (Precoding Matrix), and CQI (Channel Quality Indication). First of all, the RI indicates rank information of a channel as described above, and means the number of streams that may be received by a UE through the same time-frequency resources. Also, since the RI is determined by long-term fading of a channel, the RI may be fed back to an eNB in a longer period than a PMI value and a CQI value.

Second, the PMI is a value obtained by reflecting spatial characteristics of a channel, and indicates a precoding matrix index of an eNB, which is preferred by the UE based on a metric such as signal to interference and noise ratio (SINR). Finally, the CQI is a value indicating channel strength, and generally means a reception SINR that may be obtained by the eNB when the PMI is used.

In the 3GPP LTE-A system, the eNB may configure a plurality of CSI processes for the UE, and may be reported CSI for each of the CSI processes. In this case, the CSI process includes CSI-RS resource for specifying signal quality and CSI-IM (interference measurement) resource, that is, IMR (interference measurement resource) for interference measurement.

Since a wavelength becomes short in the field of Millimeter Wave (mmW), a plurality of antenna elements may be installed in the same area. In more detail, a wavelength is 1 cm in a band of 30 GHz, and a total of 64(8×8) antenna elements of a 2D array may be installed in a panel of 4 by 4 cm at an interval of 0.5 lambda(wavelength). Therefore, a recent trend in the field of mmW attempts to increase coverage or throughput by enhancing BF (beamforming) gain using a plurality of antenna elements.

In this case, if a transceiver unit (TXRU) is provided to control a transmission power and phase per antenna element, independent beamforming may be performed for each frequency resource. However, a problem occurs in that effectiveness is deteriorated in view of cost when TXRU is provided for all of 100 antenna elements. Therefore, a scheme is considered, in which a plurality of antenna elements are mapped into one TXRU and a beam direction is controlled by an analog phase shifter. Since this analog beamforming scheme may make only one beam direction in a full band, a problem occurs in that frequency selective beamforming is not available.

As an intermediate type of digital BF and analog BF, a hybrid BF having B TXRUs smaller than Q antenna elements may be considered. In this case, although there is a difference depending on a connection scheme of B TXRUs and Q antenna elements, the number of beam directions that enable simultaneous transmission is limited to B or less.

Figure 7:
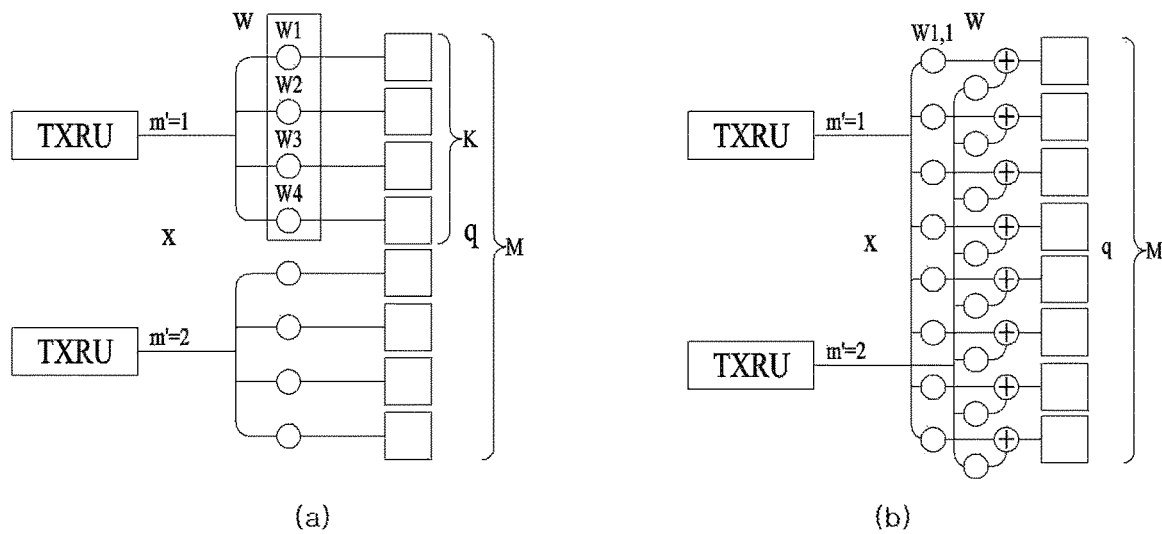
FIG. 7 illustrates examples of a connection scheme between TXRUs and antenna elements.

FIG. 7 illustrates examples of a connection scheme between TXRUs and antenna elements.

FIG. 7 (a) illustrates that TXRU is connected to a sub-array. In this case, the antenna elements are connected to only one TXRU. Unlike FIG. 7 (a), FIG. 7 (b) illustrates that TXRU is connected to all antenna elements. In this case, the antenna elements are connected to all TXRUs. In FIG. 7, W indicates a phase vector multiplied by an analog phase shifter. That is, a direction of analog beamforming is determined by W. In this case, mapping between CSI-RS antenna ports and TXRUs may be 1-to-1 or 1-to-many.

As more communication devices require greater communication capacity, the need of mobile broadband communication more advanced than the conventional RAT (radio access technology) has been issued. Also, massive MTC (Machine Type Communications) technology that provides various services anywhere and at any time by connecting a plurality of devices and things is one of main issues which will be considered in next generation communication. Furthermore, a communication system design considering service/UE susceptible to reliability and latency has been discussed. Considering this status, the introduction of the next generation RAT has been discussed, and the next generation RAT will be referred to as NewRAT in the present invention.

Figure 8:
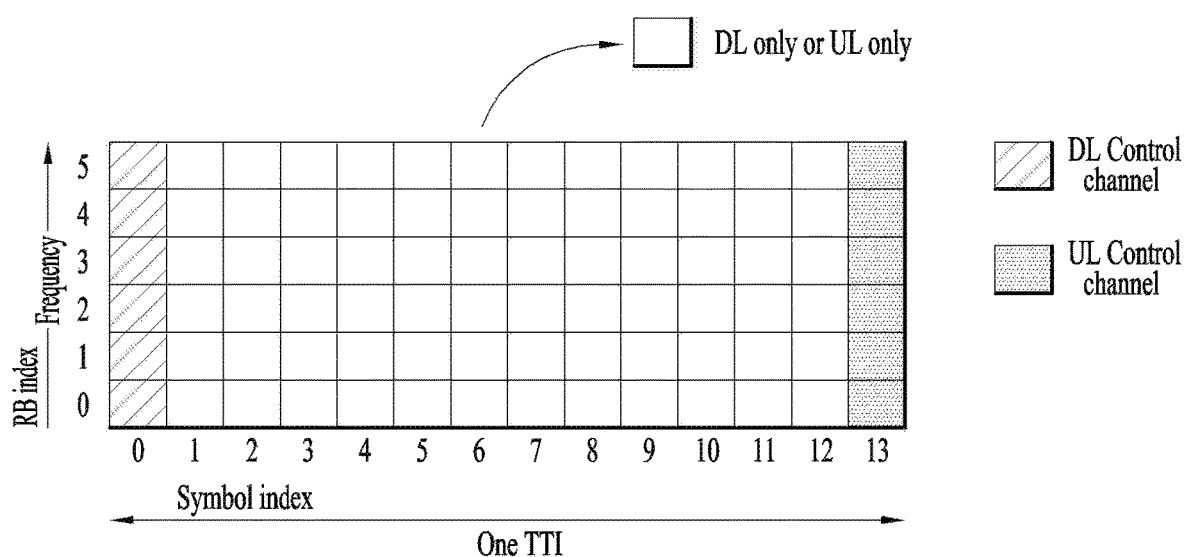
FIG. 8 illustrates an example of a self-contained subframe structure.

A self-contained subframe structure shown in FIG. 8 is considered in the fifth generation NewRAT to minimize data transmission latency in a TDD system. FIG. 8 illustrates an example of a self-contained subframe structure.

In FIG. 8, oblique line areas indicate downlink control regions and black colored areas indicate uplink control regions. Areas having no mark may be used for downlink data transmission or uplink data transmission. In this structure, downlink transmission and uplink transmission are performed in due order within one subframe, whereby downlink data may be transmitted and uplink ACK/NACK may be received within the subframe. As a result, the time required for data re-transmission may be reduced when an error occurs in data transmission, whereby latency of final data transfer may be minimized.

In this self-contained subframe structure, a time gap for switching from a transmission mode to a reception mode or vice versa is required for the base station and the UE. To this end, some OFDM symbols (OS) at the time when a downlink is switched to an uplink in the self-contained subframe structure are set to a guard period.

Examples of the self-contained subframe type that may be configured in the system operating based on the NewRAT may consider four subframe types as follows.

downlink control period+downlink data period+GP+uplink control period
downlink control period+downlink data period
downlink control period+GP+uplink data period+uplink control period
downlink control period+GP+uplink data period Described in the present invention is a Primary Synchronization Signal (PSS) design, which can reduce the timing ambiguity problem due to Carrier Frequency Offset (CFO) in a wireless communication system supportive of the next generation New RAT (NR) system, with low detection complexity. In the description of the present invention, numerology may mean a subcarrier spacing, the number of OFDM symbol(s), a subframe duration, etc.

Here, in order to distinguish physical signals/channels to be used for the next generation NR system from those of the legacy LTE system, NR-SS, NR-PSS, NR-SSS, NR-PBCH, NR-PDCCH, NR-EPDCCH, NR-PDSCH and the like shall be defined by appending 'NR-' thereto. In the present invention, an NR-PSS detected in the first place among synchronization signals and a sequence design of the NR-PSS are mainly described.

Particularly, in the present invention, the NR-PSS designing method (i.e., NR-PSS sequence generating method and resource mapping method) capable of reducing detection complexity despite being robust to carrier frequency offset is described. And, NR-PSS detection from UE's perspective is described as well.

Prior to describing the NR-PSS and NR-PSS sequence design, NR-SS (NR-Synchronization Signal) and NR-SSS (NR-Secondary Synchronization Signal) shall be described first.

<NR-SS Numerology>

1. Default Subcarrier Spacing & Parameter Sets

Parameter set for NR-SS block is defined as follows.

In 15 kHz subcarrier spacing, bandwidth is usable up to 5 MHz.
In 30 kHz subcarrier spacing, bandwidth is usable up to 10 MHz.
In 120 kHz subcarrier spacing, bandwidth is usable up to 40 MHz.
In 240 kHz subcarrier spacing, bandwidth is usable up to 80 MHz.

Moreover, regarding the NR-SS design, as 24 RBs are allocated for NR-PBCH transmission, a transmission bandwidth of 4.32 MHz is required for 15 kHZ subcarrier spacing and a transmission bandwidth of 34.56 MHz is required for 120 kHZ subcarrier spacing.

A minimum carrier bandwidth usable under 6 GHz is 5 MHz and a default subcarrier spacing may be 15 kHz. Moreover, a minimum carrier bandwidth usable within the bandwidth between 6~52.6 GHz is 50 MHz and a default subcarrier spacing may be 120 kHz.

2. Transmission Bandwidth & NR-SS Sequence RE Mapping

Figure 9:
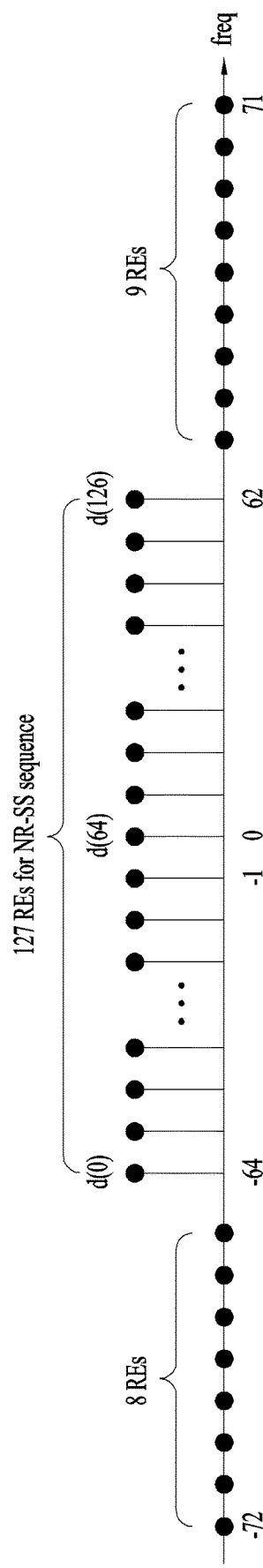
FIG. 9 is a diagram to describe an embodiment of mapping a synchronization signal sequence to a resource element.

Referring to FIG. 9, in a manner similar to the method of mapping PSS/SSS sequence to RE in LTE, NR-SS sequence may be mapped to Res located at the center part of a transmission bandwidth and some REs located at the edge of the transmission bandwidth may be reserved as guard subcarrier. For example, if 12 RBs are used for NR-SS transmission, 127 Res are used for NR-SS sequence and 17 Res are reserved. In this case, the $64^{th}$ element of the NR-SS sequence may be mapped to a center subcarrier of NR-SS transmission bandwidth.

Meanwhile, considering that NR sequence is mapped to RE, it is able to assume that transmission bandwidth of 2.16 MHz is used for NR-SS transmission in case of 15 kHz subcarrier. Moreover, if a subcarrier spacing increases by an integer multiple, NR-SS bandwidth increases by the same integer multiple as well.

Namely, the bandwidth for the NR-SS may be defined according to a subcarrier spacing as follows.

If a subcarrier spacing is 15 kHz, an NR-SS bandwidth may be 2.16 MHz.
If a subcarrier spacing is 30 kHz, an NR-SS bandwidth may be 4.32 MHz.

If a subcarrier spacing is 120 kHz, an NR-SS bandwidth may be 17.28 MHz.

If a subcarrier spacing is 240 kHz, an NR-SS bandwidth may be 34.56 MHz.

<NR-SSS Sequence Design>

In NR system, the number of NR-PSS sequences is defined as 3 to sort 1,000 cell IDs and the number of hypotheses of NR-SSS corresponding to each NR-PSS is defined as 334.

NR-SSS sequence is generated as a single long sequence. To generate 334 hypotheses, the NR-SSS sequence is generated as a combination of 2 M-sequences having different polynomials. For example, if a cyclic shift value for a first M-sequence is 112 and a cyclic shift value for a second M-sequence is 3, total 336 hypotheses can be obtained. In this case, a scrambling sequence for NR-PSS can be obtained by applying a third M-sequence.

If an NR-SS burst set having a relatively short period like 5 ms/10 ms is configured, the NR-SS burst set can be transmitted several times within two 10 ms radio frames.

Hence, if different NR-SSS sequences for the NR-SS burst set transmitted several times are employed, i.e., if a different NR-SSS sequence is used each time the NR-SS burst set is transmitted, a UE can distinguish each of a plurality of NR-SS burst sets transmitted within a default period.

For example, if an NR-SS burst set is transmitted 4 times within a default period, an original set of an NR-SSS sequence is applied to a first NR-SS burst set and an NR-SSS sequence different from the original set can be regarded as applied to second to fourth NR-SS burst sets. Moreover, if 2 different NR-SSS sequence sets are used, one NR-SSS sequence set is used for first and third NR-SSS burst sets and the other NR-SSS sequence set can be used for second and fourth NR-SSS burst sets.

An NR-SSS sequence defined in the NR system defines two M-sequences, each of which has a length of 127, and generates a final sequence from multiplication of elements included in each of the M-sequences.

Namely, the NR-SSS sequence may be a scrambling sequence given by NR-PSS, have a length of 127, and be determined by Equation 1.

$$d(n)=s_{1,m}(n)s_{2,k}(n)c_z(n) \text{ for } n=0,\ldots,126 \text{ and } z=0,1 \quad \text{[Equation 1]}$$

Here, 'z=0' is usable for NR-SSS transmitted in the first SS burst set of two 10 ms radio frames. And, 'z=1' is usable for NR-SSS transmitted in the second to fourth SS burst sets.

In this case, the $s_{1,m}(n)$ and $s_{2,k}(n)$ can be determined by Equation 2.

$$s_{1,m}(n)=S_1((n+m)\bmod 127),$$

$$s_{2,k}(n)=S_2((n+k)\bmod 127) \quad \text{[Equation 2]}$$

Here, it is able to define m=$N_{ID1}$ mod 112, K=floor($N_{ID1}$/112), k=$CS_2$(K), 0≤NID1≤333, and $CS_2$∈{48, 67, 122}.

Finally, to find $S_1$ and $S_2$, it is able to define $S_r(i)=1-2x(i)$, 0≤I≤126, and r=1,2. In this case, a polynomial for x(i) can be defined by Equation 3.

$$x(j+7)=(x(j+3)+x(j))\bmod 2, r=1$$

$$x(j+7)=(x(j+3)+x(j+2)+x(j+1)+x(j))\bmod 2, r=2 \quad \text{[Equation 3]}$$

Here, the initial conditions for x(i) may include x(0)=x(1)=x(2)=x(3)=x(4)=x(5)=0 and x(6)=1 and have a value of 0≤j≤119.

Here, as a preamble signal and a mid-amble signal of SSS, two scrambling sequences $C_0(n)$ and $C_1(n)$ can be used, respectively. The two scrambling sequences may depend on PSS and be defined by applying two different cyclic shifts to the M-sequence 'C(n)' like Equation 4.

$$c_z(n)=C((n+p)\bmod 127) \quad \text{[Equation 4]}$$

where, p=$CS_1(N_{ID2}+3\cdot z)$, $CS_1$∈{23, 69, 103, 64, 124, 24}, $N_{ID2}$∈{0,1,2}

Here, it is able to define C(i)=1−2x(i) and 0≤I≤126. In this case, a polynomial for x(i) can be defined by Equation 5.

$$x(j+7)=(x(j+5)+x(j+4)+x(j+3)+x(j+2)+x(j+1)+x(j))\bmod 2 \quad \text{[Equation 5]}$$

Here, initial conditions for x(i) may include x(0)=x(1)=x(2)=x(3)=x(4)=x(5)=0 and x(6)=1 and have a value of 0≤j≤119.

Now, the NR-PSS sequence according to the present invention is described in earnest.

<NR-PSS Sequence Design Robust to Carrier Frequency Offset>

The NR system supports more various frequency bands than the LTE system. The NR system supports up to 6 GHz band, whereas the LTE system supports up to 3 GHz band. Hence, when NR-PSS is designed in the NR system, a relatively large Carrier Frequency Offset (CFO) situation.

Meanwhile, in the LTE system, a subframe boundary is detected using PSS designed with a ZC sequence. Yet, in case that CFO is large, since a detecting method using a ZC sequence has timing ambiguity, error detection probability (false alarm probability) may increase in detecting a subframe boundary.

Therefore, in case that CFO is large, as a PSS designing method for removing timing ambiguity, the two items can be considered as follows.

First of all, there is a method of increasing a subcarrier spacing of PSS. According to this method, as a length of a sequence on a determined bandwidth is reduced by an increased amount of a subcarrier spacing, detection performance may be lowered.

Secondly, there is a method of modifying a PSS design to enable a ZC sequence to be robust to frequency offset. Compared with the first method, this method can advantageously use a longer sequence on the same bandwidth and decrease detection complexity according to a design method and a detection method.

Therefore, based on the second method in the above description, the present invention proposes sequences usable as NR-PSS and an RE allocating method if a default frequency band for transmitting NR-SS is configured in advance and a default numerology is used for the default frequency band. The present invention assumes that the default numerology uses a subcarrier spacing of 15 kHz, a bandwidth of 2.16 MHz and 144 REs.

Although there may be various NR-PSS design methods robust to carrier frequency offset usable for NR system, the present invention proposes an embodiment as follows.

In the PSS design of the LTE system, a ZC sequence having a length amounting to $(2^n-1)$ is used. For the NR-PSS design robust to carrier frequency offset, a default subcarrier spacing of 15 kHz can be increased into 30 kHz or 60 kHz scalably. Yet, if a subcarrier spacing increases L times, a sequence length decreases 1/L time, whereby NR-PSS detection performance is lowered.

Looking into another method, NR-PSS may be configured to be transmitted through N sub-symbol durations in a manner of dividing 1 symbol into N sub-symbol durations instead of transmitting the NR-PSS in a whole symbol.

Figure 10:
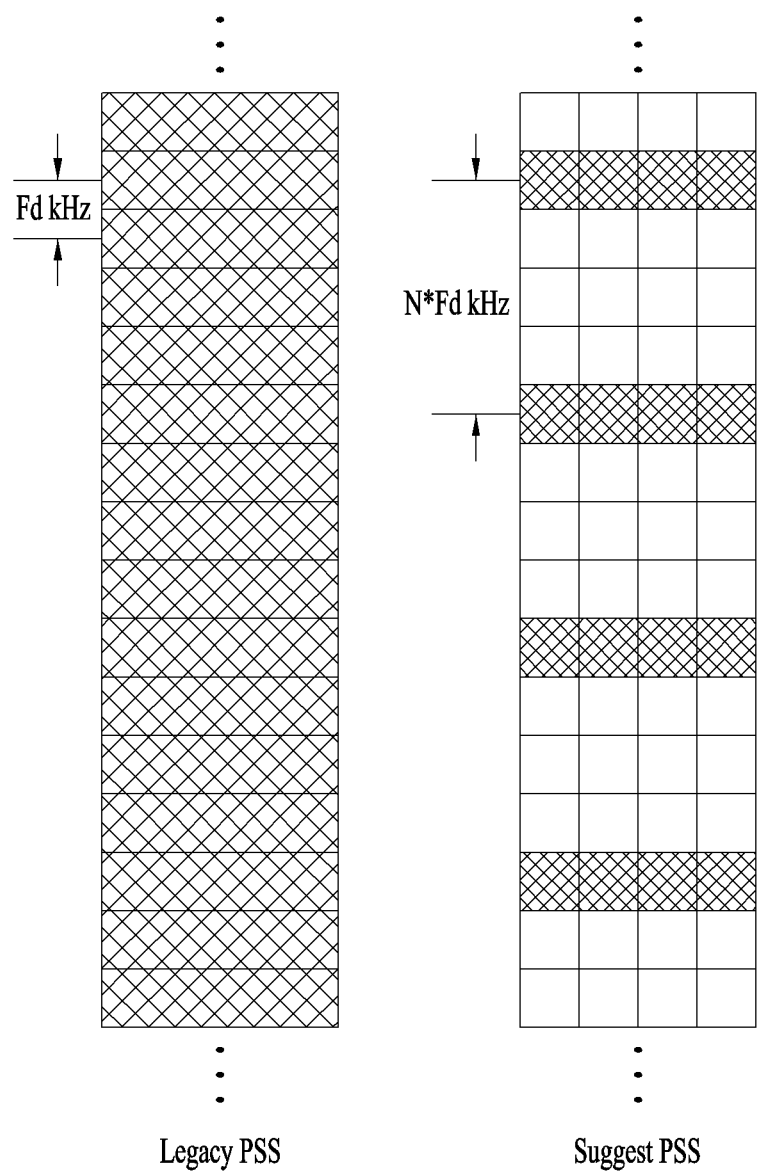

Referring to FIG. 10, in case of the existing PSS, a PSS sequence is mapped to a single symbol according to a subcarrier. Yet, regarding NR-PSS according to the present invention, 1 symbol is divided into N sub-symbol durations and NR-PSS sequence is mapped through each of the sub-symbol durations. Hence, a single sequence element is mapped to each of N subcarriers, which brings an effect like transmitting NR-PSS in a subcarrier spacing of N*15 kHz without variation of a total sequence length.

Namely, if N=4, 1 symbol is divided into 4 sub-symbol durations and a single sequence element is mapped to every 4 subcarriers. Thus, it brings the same effect as transmitting NR-PSS in a subcarrier spacing of 60 kHz without variation of a total sequence length.

In this case, a different sequence may be mapped to each sub-symbol or a same sequence may be repeatedly mapped. If transmission is performed in this manner, it brings an effect that NR-PSS has a subcarrier spacing of 15*N kHz. Hence, although NR-PSS is transmitted through N sub-symbol durations, it can be transmitted in the same time as taken to transmit the NR-PSS in a single symbol with a subcarrier spacing of 15 kHz.

Of course, transmission may be performed in a manner of mapping an NR-PSS sequence through M symbols instead of dividing 1 symbol into N sub-symbol durations. Moreover, in this case, by mapping an NR-PSS sequence element to every M subcarriers, it is able to bring an effect as if using a subcarrier spacing of M*15 kHz.

Yet, in this case, it causes a problem that a time taken to transmit the NR-PSS increases M times.

Particularly, in case of transmitting an NR-PSS sequence through M symbols, Peak-to-Average Power Ratio (PAPR) performance may be lowered due to the effect of a Cyclic Prefix (CP) included in each symbol.

So to speak, if an NR-PSS sequence is mapped through M symbols, M CPs exist. Hence, when correlation is performed on NR-PSS, peak as points amounting to M CPs are generated, overall PAPR performance is lowered. Therefore, if M symbols to which an NR-PSS sequence is mapped increase more, PAPR performance is further lowered disadvantageously.

Yet, after 1 symbol is divided into N sub-symbol durations, if an NR-PSS sequence is mapped through the N sub-symbol durations, since it means that 1 symbol is used eventually, 1 CP exists. Hence, when correlation is performed on NR-PSS, a peak point corresponding to 1 CP is generated, thereby preventing PAPR performance from being lowered.

Meanwhile, in case of transmitting NR-PSS through N sub-symbol durations, N sequences should be generated respectively. The generated sequences have a length shorter by 1/N than a case of transmitting NR-PSS through 1 whole symbol. The generated sequences may have the same root index or different root indexes all.

In this case, it may be able to make a final time domain sequence having a length $N_{IFFT}$ in a manner of mapping each of the generated sequences according to a frequency domain and repeating Inverse Fast Fourier Transform (IFFT) in a size $N_{IFFT}/N$. However, if so, it may cause a problem of out-of-band emission due to the influence of an adjacent symbol or sub-symbol.

Figure 11:
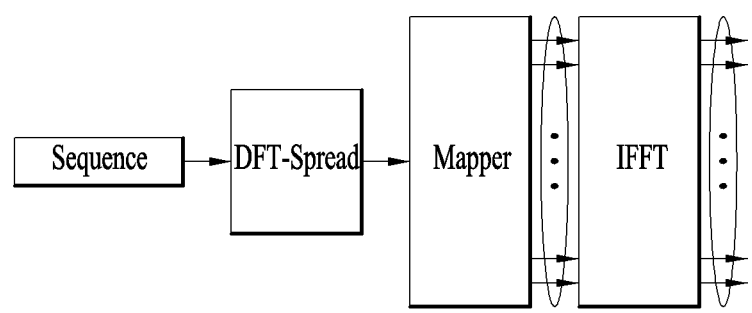

A method for solving this problem is described with reference to FIG. 11. Assuming that N sub-symbol durations are S1, S2 . . . Sn, sequences of S1, S2 . . . Sn are concatenated before performing IFFT, Discrete Fourier Transform (DFT) spreading is performed with a total sequence length, a plurality of sequences respectively corresponding to the N sub-symbol durations are mapped, and IFFT is then performed. If so, it is able to obtain a time domain sequence of a length $N_{IFFT}$ without the out-of-band emission problem. Namely, the sequence shown in FIG. 11 is the whole sequence that connects N sequences mapped to N sub-symbol durations.

Here, if CP amounting to a CP length used by an OFDM symbol having a default subcarrier spacing is generated and then mapped before the N sub-symbol durations, a final time domain OFDM symbol is completed. Each time a base station transmits NR-PSS, the base station can use a sequence for the transmission in a manner of generating a sequence by the above-described process or storing a sequence having proceeded to a DFT spreading process and loading the stored sequence. Meanwhile, in the transmission process, the NR-PSS is transmitted by being multiplexed with NR-SSS, NR-PBCH and data channels.

The following description shall be made by applying specific numbers to the above-described embodiment. When a bandwidth is 2.16 MHz, if it is intended to transmit NR-PSS on 144 REs through 4 sub-symbol durations, 4 sequences, each of which is configured in length of 32, are generated and DFT spreading is then performed by concatenating the 4 sequences.

In this case, an equation for generating a sequence may include Equation 6.

$$d_u(i) = DFT([\ s1_u(n)\ \ s2_u(n)\ \ s3_u(n)\ \ s4_u(n)\ ]) \quad \text{[Equation 6]}$$

$$i = 0 \sim 127$$

where, $$s1_u(n) = \begin{cases} e^{-j\frac{\pi u n(n+1)}{31}} & n = 0, 1, \ldots 3, 0 \\ 0 & n = 31 \end{cases}$$

$$s2_u(n) = [s1_u(n)]^* \quad n = 0, 1, \ldots 3, 1$$
$$s3_u(n) = s1_u(n) \quad n = 0, 1, \ldots 3, 1$$
$$s4_u(n) = [s1_u(n)]^* \quad n = 0, 1, \ldots 3, 1$$

Here, each sequence uses a ZC sequence having a length corresponding to $2^n-1$. Since 144 REs are used in the example, each sequence uses a 31-length ZC sequence.

Moreover, root index pairs usable for Equation 6 may include {1, 30}, {7, 24}, {4, 27}, etc.

By the way, a length of a sequence should be changed into 32 from 31 in order to perform 128-DFT. To this end, two kinds of methods may exist.

According to a first method, a 32-length sequence is generated by inserting 0 before or after. According to a second method, a length can be made into 32 by cycling a $1^{st}$ sequence to a $32^{nd}$ sequence.

Meanwhile, a root index can be selected so as to establish the conjugate complex relation between S1/S3 and S2/S4. For example, if a root index of S1 is 7, 24 is selected as a root index of S2/S4.

A time domain sequence can be generated in a manner of performing DFT spreading on each of the generated sequences, mapping the DFT-spread sequence like FIG. 12 (a), and then performing 1024 IFFT thereon. Thereafter, if a CP of length 80 or 72 is mapped before a symbol to which the sequences are mapped, a final time domain OFDM symbol is completed. The completed final time domain OFDM symbol has the form shown in FIG. 12 (a).

To raise correlation performance, a cover code is used for each of sub-symbol durations of a final time domain OFDM symbol shown in FIG. 12 (a), whereby an NR-PSS sequence may be mapped like FIG. 12 (b). FIG. 12 (b) shows an example of using a cover code [1 1 −1 1].

The sequence generated by the method like the embodiment shown in FIG. 12 can reduce complexity when a sequence detection operation is performed in a UE. Moreover, in the aforementioned embodiment, if the conjugate complex relation is established between S1/S3 and S2/S4, an NR-PSS sequence mapped through 4 time domain symbols, i.e., 4 sub-symbol durations has the form like [(S1) (S1*) (S1) (S1*)].

In this case, since S1 and S1* are repeated, when correlation is calculated, an operation can be performed using a first sub-symbol duration and a second sub-symbol duration only. Namely, correlation is performed based on S1 and correlation is then performed based on S1*, whereby a peak value can be found.

Moreover, if the conjugate complex relation of S1 and S1* is used, an operation of performing correlation with S1* results in the same multiplication operation but a different addition operation, whereby an operation amount can be reduced into about half. Hence, detection complexity may decrease into about ¼ in comparison with performing a correlation operation with a total length sequence.

Meanwhile, the aforementioned embodiment is described based on a case that the number of hypothesis of NR-PSS is 1. Yet, if it is intended to sort a cell ID group or detect a period of 5 ms using NR-PSS, a multitude of NR-PSS hypotheses are required.

Therefore, according to the above-described embodiment, regarding a sequence, in order to make the conjugate complex relation, a root index of a sub-symbol duration 1 and a sub-symbol duration 3 is set to 7 and a root index of a sub-symbol duration 2 and a sub-symbol duration 4 is set to 24. Here, to make an additional sequence, if a root index 24 is used for sub-symbol durations 1 and 3 and a root index 7 is used for sub-symbol durations 2 and 4, the hypothesis number of NR-PSS can be increased into 2.

Moreover, in the cover code used form like FIG. 12 (b), if positions of the sub-symbol durations 1 and 2 and positions of the sub-symbol durations 3 and 4 are switched to each other, two or more NR-PSS hypotheses can be made.

Accordingly, it is a matter of course that the above-described embodiment is extendable to a case of two or more NR-PSS hypotheses.

Additionally, although the aforementioned methods assume that a synchronization bandwidth is about 2 MHz (particularly, 2.16 MHz) and also assume an NR-PSS sequence length, if the synchronization bandwidth increases L times, a length of a sequence can be adjusted by L times scalably and then applied to the aforementioned methods. For example, if a synchronization bandwidth is set to about 5 MHz (particularly, 4.32 MHz), lengths of NR-PSS sequences according to the above-described method can be made to increase 2 times.

<NR-PSS Sequence Design Having Low Detection Complexity>

When NR-PSS is designed in NR system, there may be various methods for having low detection complexity. The present invention proposes a method of using a binary sequence to reduce detection complexity instead of a ZC sequence used for LTE-PSS.

If a binary sequence is used, it may be able to reduce timing ambiguity possibly occurring in case of using PSS designed on the basis of a ZC sequence in an NR system situation that should consider a large carrier frequency offset. Therefore, in the present invention, a method of generating an NR-PSS sequence having low detection complexity usable for an NR system and a resource mapping method are described.

The present invention proposes sequences usable as NR-PSS and a resource allocating method in case that a default frequency band for transmitting SS is configured in advance and that the default frequency band uses a default numerology. The default numerology assumed by the present invention includes a subcarrier spacing of 15 kHz, a bandwidth of 2.16 MHz and 144 REs.

In order to lower the complexity of PSS detection in NR system, a binary sequence may be used. Although there are various kinds of binary sequences, the present invention shall be described on the assumption of using an M-sequence of which generating method is simple with good correlation property. Namely, in case of using M-sequence instead of ZC sequence of a length corresponding to $(2^m-1)$ used for PSS of the LTE system, it is able to generate a sequence like the following embodiments.

Embodiment 1

A time domain sequence is generated in a manner of generating a frequency domain M-sequence having a length $(2^m-1)$, mapping the M-sequence to every subcarrier, and then performing IFFT thereon. Yet, DC subcarrier after the mapping is processed by nulling.

According to Embodiment 1, detection complexity of NR-PSS does not become less than PSS detection complexity of LTE. Moreover, Peak-to-Average Power Ratio (PAPR) increases due to sequence property, which requires a power amplifier of high performance. Thus, a price of a product is raised. Yet, the timing ambiguity due to the large carrier frequency offset is reduced and noise suppression effect can be obtained because of the nulling of the DC subcarrier.

Embodiment 2

A time domain sequence is generated in a manner of generating a frequency domain M-sequence having a length $(2^{m-1}-1)$, mapping the M-sequence to a subcarrier as an interleaved type, and then performing IFFT thereon.

According to Embodiment 2, detection complexity of NR-PSS does not become less than PSS detection complexity of LTE. Moreover, Peak-to-Average Power Ratio (PAPR) increases due to sequence property, which requires a power amplifier of high performance. Thus, a price of a product is raised. Yet, there is an effect that the timing ambiguity due to the large carrier frequency offset is reduced.

Moreover, since the time domain sequence is generated in a manner of being repeated N times because of the interleaved type mapping in the frequency domain, it is advantageous that a fractional frequency offset can be found from NR-PSS.

Embodiment 3

A zero-appended M-sequence of a length $2^m$ is generated in a manner of generating a time domain M-sequence having a length $(2^{m-1}-1)$ and then appending 0 before or after the generated M-sequence. Then, a time domain sequence is generated in a manner of performing DFT spreading on the M-sequence, mapping the M-sequence to every subcarrier, and performing IFFT thereon. Yet, DC subcarrier after the mapping is processed by nulling.

According to Embodiment 3, unlike the case of using the frequency domain M-sequence, it may have low detection complexity owing to the property of the binary sequence. Moreover, there is an effect that PAPR becomes lower than that of Embodiment 1 or 2. Besides, in a manner similar to the embodiments that employ the frequency domain M-sequence, the timing ambiguity due to the large carrier frequency offset is reduced. Since DC subcarrier is nulled, noise suppression effect can be obtained.

Embodiment 4

A zero-appended M-sequence of a length $2^{m-1}$ is generated in a manner of generating a time domain M-sequence having a length ($2^{m-1}-1$) and then appending 0 before or after the generated M-sequence. Then, a time domain sequence is generated in a manner of performing DFT spreading on the M-sequence, mapping the M-sequence to a subcarrier as an interleaved type, and performing IFFT thereon.

According to Embodiment 4, unlike the case of using the frequency domain M-sequence, it may have low detection complexity owing to the property of the binary sequence. And, there is an effect that PAPR becomes lower than that of Embodiment 1 or 2. Moreover, in a manner similar to the embodiments that employ the frequency domain M-sequence, the timing ambiguity due to the large carrier frequency offset is reduced.

Besides, since the time domain sequence is generated in a manner of being repeated N times because of the interleaved type mapping in the frequency domain, it is advantageous that a fractional frequency offset can be found from NR-PSS.

Embodiment 5

A zero-appended M-sequence of a length $2^{m-1}$ is generated in a manner of generating a time domain M-sequence having a length ($2^{m-1}-1$) and then appending 0 before or after the generated M-sequence. After a time domain sequence of a length $2^{m+k-1}$ has been generated by repeating the generated sequence $2^k$ times, DFT spreading is performed on the generated M-sequence.

Thereafter, a time domain sequence is generated in a manner of mapping the DFTed M-sequence to a subcarrier as an interleaved type and then performing IFFT thereon.

According to Embodiment 5, since the time domain sequence is generated in a manner of being repeated N times because of the interleaved type mapping in the frequency domain, the early zero appended M-sequence of the length $2^{m-1}$ is repeated K*N times. Since the sequence according to Embodiment 5 is a sequence of a repetition type, it has the effect similar to Embodiment 4.

Although information can be transmitted on DC subcarrier in NR unlike LTE, it may be designed to process nulling on DC subcarrier for noise suppression or not to map a sequence to DC subcarrier. In the cases of Embodiment 1 and Embodiment 3, DC subcarrier is nulled after mapping a sequence. In case of the mapping with the interleaved type like Embodiment 2, Embodiment 4 and Embodiment 5, DC subcarrier may be nulled or deployed not to be mapped by a sequence according to a mapping manner.

Moreover, according to an interleaved spacing, it is able to design that a count of repetitions of a sequence in a time domain is varied. As the manner that a sequence is repeatedly mapped in the time domain can perform resource mapping flexibly as well as find a fractional frequency offset using the repetition pattern, it can be usefully used in a situation that a bandwidth is changed scalably.

Moreover, in a situation that a wider subcarrier spacing is required, it is able to use an embodiment of mapping a sequence in an interleaved form.

Meanwhile, the sequence generating methods of Embodiments 1 to 5 are identically applicable to a complex type sequence such as a ZC sequence except the binary sequence described in the present invention.

In the following, a method of generating an NR-PSS sequence and mapping the generated NR-PSS sequence to a resource is described centering on the above-described Embodiment 4.

According to Embodiment 4, in order to generate an NR-PSS sequence of a length $2^m$, an M-sequence of a length ($2^{m-1}-1$) is generated first. Thereafter, a time domain sequence is generated by performing DFT spreading on the generated M-sequence and then performing IFFT on the DFT spreading performed M-sequence.

Figure 13:
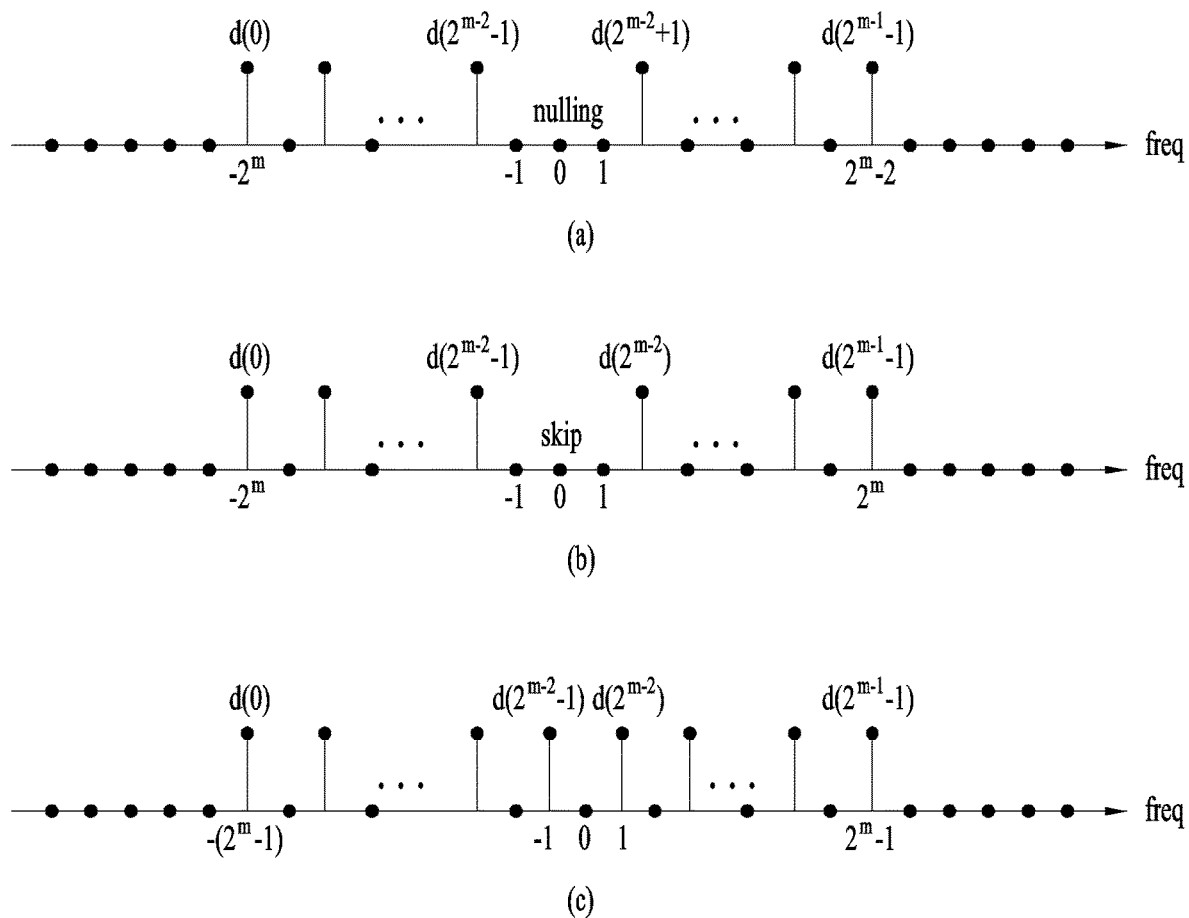

A specific process of Embodiment 4 shall be described in detail with reference to FIG. 13. FIGS. 13 (a) to 13 (c) are diagrams showing the specific embodiments to which Embodiment 4 is applicable.

Embodiment for FIG. 13 (a)

An M-sequence (zero appended m-sequence) of a length $2^{m-1}$ is generated by appending a zero value before or after a generated M-sequence of a length ($2^{m-1}-1$), DFT spreading is performed with a total M-sequence length, and the M-sequence is then mapped to an even subcarrier only. And, a part corresponding to DC subcarrier is processed by nulling. Thereafter, a time domain sequence is generated by performing IFFT on the mapped M-sequence.

Embodiment for FIG. 13 (b)

An M-sequence (zero appended m-sequence) of a length $2^{m-1}$ is generated by appending a zero value before or after a generated M-sequence of a length ($2^{m-1}-1$), DFT spreading is performed with a total M-sequence length, and the M-sequence is then mapped to an even subcarrier only. In this case, a part corresponding to DC subcarrier is skipped and the M-sequence is mapped. Thereafter, a time domain sequence is generated by performing IFFT on the mapped M-sequence.

Embodiment for FIG. 13 (c)

An M-sequence (zero appended m-sequence) of a length $2^{m-1}$ is generated by appending a zero value before or after a generated M-sequence of a length ($2^{m-1}-1$), DFT spreading is performed with a total M-sequence length, and the M-sequence is then mapped to an odd subcarrier only. In this case, since the M-sequence is mapped to the odd subcarrier only, it is not mapped to DC subcarrier. Thereafter, a time domain sequence is generated by performing IFFT on the mapped M-sequence.

If the above-described embodiments shown in FIG. 13 are implemented, it is able to generate a time domain sequence of a length $N_{IFFT}$.

Here, a CP amounting to a CP length used by an OFDM symbol having a default subcarrier spacing is generated. If the generated CP is mapped before the generated time domain sequence, a final time domain OFDM symbol is completed.

As shown in FIG. 11, each time a base station transmits NR-PSS, the base station can use a sequence for the transmission in a manner of generating a sequence by the above-described process or storing a sequence having proceeded to a DFT spreading process and loading the stored sequence. Meanwhile, in the transmission process, the NR-PSS is transmitted by being multiplexed with NR-SSS, NR-PBCH and data channels. Namely, the sequence shown in FIG. 11 may include an M-sequence (zero appended m-sequence) of a length $2^{m-1}$.

The following description shall be made by applying specific numbers to the above-described embodiment. When a bandwidth is 2.16 MHz, in case of transmitting an OFDM symbol through 144 REs, an M-sequence of a length 63 is generated ($144>2^7>2^6-1=63$), an M-sequence (zero appended m-sequence) of a length 64 is generated by appending 0 before or after the generated sequence, and DFT spreading is then performed. If the DFT-spread sequence is mapped like FIG. 13 (c) and 1024 IFFT is performed thereon, a time domain sequence can be generated. Thereafter, if a CP of a length 80 or 72 is mapped before a symbol having the sequences mapper thereto, a final time domain OFDM symbol is completed.

A sequence generated by the above method is advantageous in lowering complexity when a UE detects the sequence. Moreover, since it is a time domain binary sequence, an operation for finding correlation in a time domain can be implemented without multiplication. Moreover, if mapping of an interleaved type is performed, the sequence is repeated in the time domain. Hence, it is possible to calculate correlation through a sequence corresponding to a half of a total length.

Meanwhile, according to the present invention, an M-sequence can be generated by a polynomial such as Equation 7.

$$x(j+7)=(x(j+6)+x(j+4)+x(j+1)+x(j)) \bmod 2 \quad \text{[Equation 7]}$$

here, an initial condition for x(i) includes $x(0)=x(1)=x(2)=x(3)=x(4)=x(5)=0$, $x(6)=1$ and may have a value of $0 \leq j \leq 119$. Moreover, a cyclic shift value of the M-sequence may have one of 0, 31 and 78.

Meanwhile, the above-described embodiment is described based on a case that the hypothesis number of NR-PSS is 1. Yet, in case of intending to sort a cell ID group using NR-PSS or detect a period of 5 ms, a multitude of NR-PSS hypotheses are required.

Therefore, according to the above-described embodiment, regarding a sequence, in order to increase the hypothesis number of NR-PSS, if an M-sequence is cyclically shifted or several primitive polynomials are defined, a multitude of hypotheses of NR-PSS can be provided.

Therefore, an embodiment according to the present invention can be extended and applied to have two or more hypotheses of NR-PSS. Namely, this embodiment can be extended and applied to a case that the hypothesis number of NR-PSS is equal to or greater than 2.

Additionally, the above-described methods assume that a synchronization bandwidth of about 2 MHz (specifically, 2.16 MHz) and an NR-PSS sequence length. Yet, if the synchronization bandwidth increases L times, a length of a sequence is adjusted L times scalably so as to be applied to the above-described methods. For example, if a synchronization bandwidth is set to about 5 MHz (specifically, 4.32 MHz), lengths of the NR-PSS sequences of the above-described embodiment can be made to increase two times.

Meanwhile, for clarity of the description, a method of generating a sequence using an M-sequence and mapping a resource is described in the present invention. Yet, the proposed method is applicable to a binary sequence other than the M-sequence. And, a method of DFT-spreading a time domain sequence and mapping it to an even or odd subcarrier as an interleaved type is also applicable to other complex sequences as well as to the ZC sequence.

Moreover, in case of implementing the present invention actually, although the above-described embodiments can be implemented independently, various embodiments disclosed in the present specification may be applicable in a manner of being combined with each other.

<Measurement Result>

Now, performance measurement results according to the embodiments proposed in the present invention are examined. In the preset test for performance measurement of NR-PSS, three kinds of NR-PSS design methods are considered. 1) Frequency domain M-sequence (Conventional PSS sequence) 2) M-sequence having low PAPR (NR-PSS sequence having low detection complexity in the present invention) 3) Sequence concatenating 4 ZC sequences in a time domain (NR-PSS sequence robust to a carrier frequency offset in the present invention)

Moreover, measurement of NR-PSS uses the NR-SSS sequence proposed by the present invention.

1. NR-PSS Sequence Design

PAPR & CM

Measurement results of PAPR and CM for NR-PSS sequences of the aforementioned three types are shown in Table 1.

TABLE 1

| | PAPR [dB] | CM [dB] |
|---|---|---|
| Frequency domain M-sequence (WA) | 4.87, 5.10, 5.74 | 1.25, 1.76, 2.19 |
| M-sequence with low PAPR | 4.16, 3.99, 4.15 | 1.10, 1.42, 1.50 |
| Four ZC sequences concatenation in time | 2.80, 3.49, 3.91 | 0.094, 0.71, 0.79 |

According to the above results, PAPR/CM of NR-PSS based on a sequence of concatenating 4 ZC sequences in time domain is lower than PAPR/CM of NR-PSS based on an M-sequence. Meanwhile, comparing an M-sequence having a low PAPR with a frequency domain M-sequence, PAPR/CM of the M-sequence having the low PAPR is lower than PAPR/CM of the frequency domain M-sequence. Meanwhile, since PAPR/CM is a significant factor for determining a price of a power amplifier, it is necessary to consider designing NR-PSS having low PAPR/CM.

Conclusionally, from a perspective of PAPR/CM, the ZC-sequence based NR-PSS shows performance measurement result better than that of the M-sequence based NR-PSS. The NR-PSS based on the M-sequence having the low PAPR shows performance measurement result better than the NR-PSS of the frequency domain M-sequence.

Misdetection Rate

Figure 14:
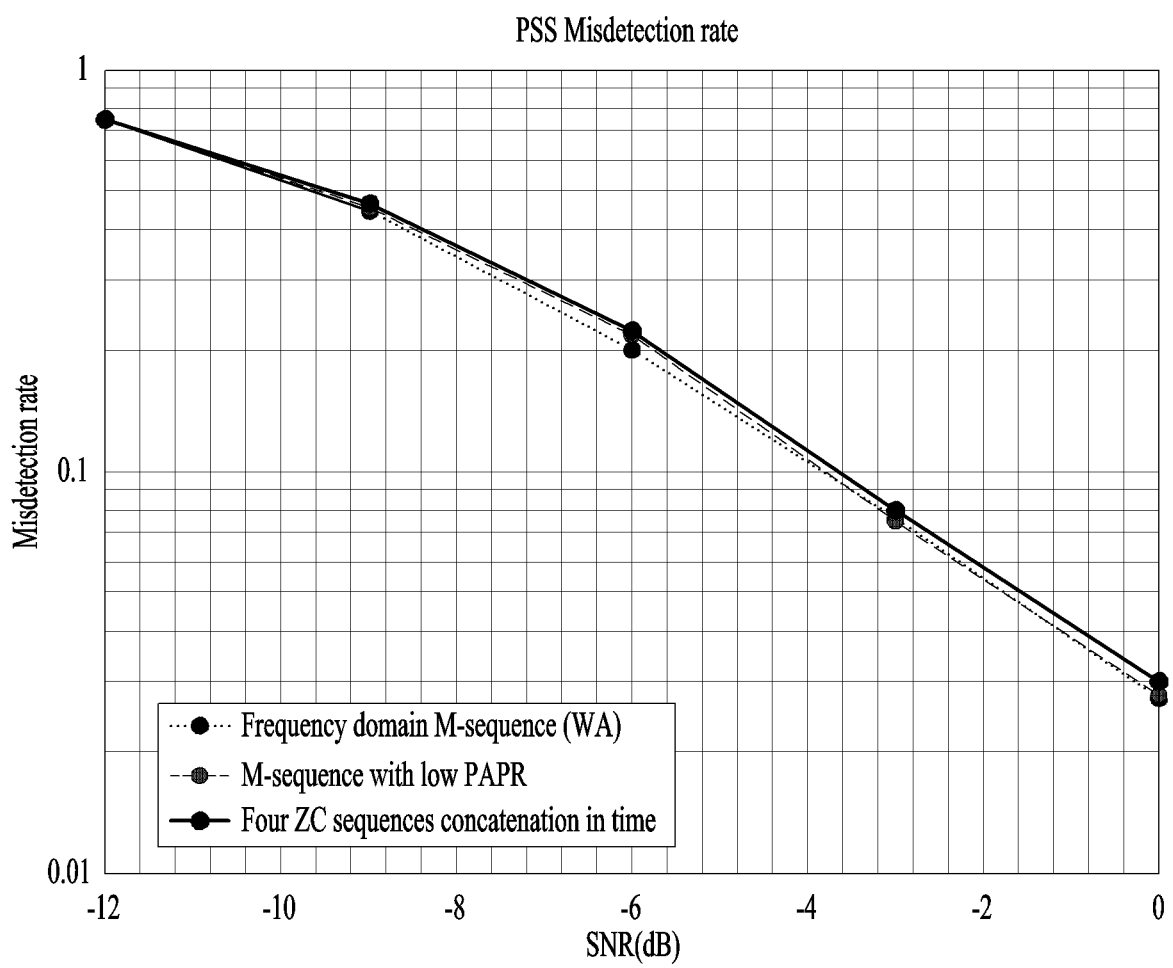
FIGS. 14 to 17 are diagrams to describe the measurement results of detection performance and Peak to Average Power Ratio (PAPR) performance in transmitting a synchronization signal according to an embodiment of the present invention.

FIG. 14 shows measurement evaluation of each of the NR-PSS misdetection rates. From FIG. 14, in can be observed that performance of each NR-PSS design is on a similar level. Yet, referring to FIG. 15, it can be observed that a sequence having 4 concatenated ZC sequences has the lowest detection complexity.

Figure 15:
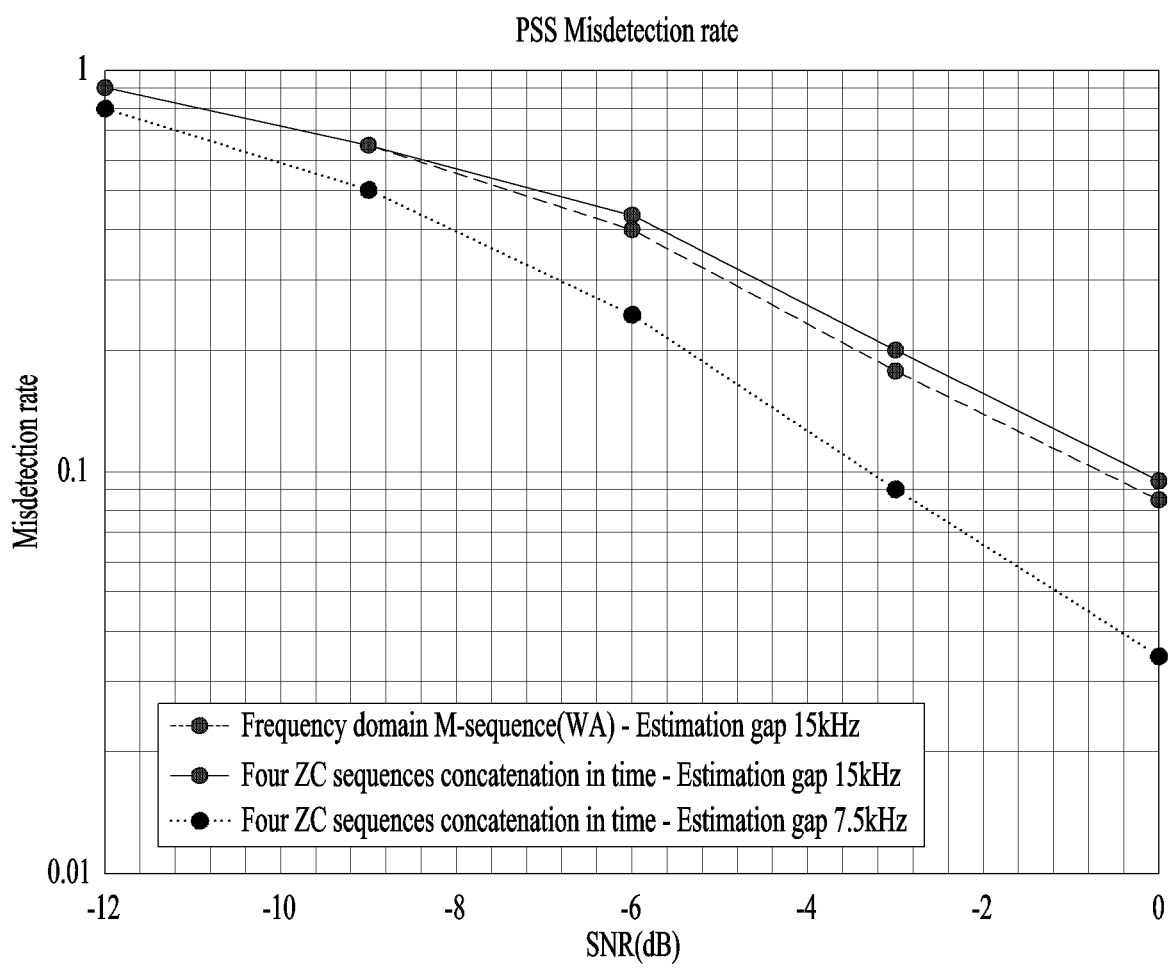

Particularly, referring to FIG. 15, a sequence having 4 concatenated ZC sequences and a frequency domain sequence show similar detection performance. In this case, it is advantageous that detection complexity of the sequence having 4 concatenated ZC sequences is lower. Moreover, assuming that the aforementioned NR-PSS has similar detection complexity, the sequence having 4 concatenated ZC sequences provides performance better than that of the M-sequence.

In conclusion, on the assumption of having the same detection complexity, detection performance of the ZC-sequence based NR-PSS design provides performance better than that of detection performance of the frequency domain M-sequence.

2. SSS Sequence Design

Now, detection performance according to the NR-SSS sequence number is compared. For performance measurement, a conventional SSS sequence and an NR-SSS provided by the present invention are compared with each other.

Schematic information on the NR-SSS sequence design is described as follows.

1) NR-SSS of a single set (having 334 hypotheses per NR-PSS sequence)

2) NR-SSS of two sets (having 668 hypotheses per NR-PSS sequence)

Figure 16:
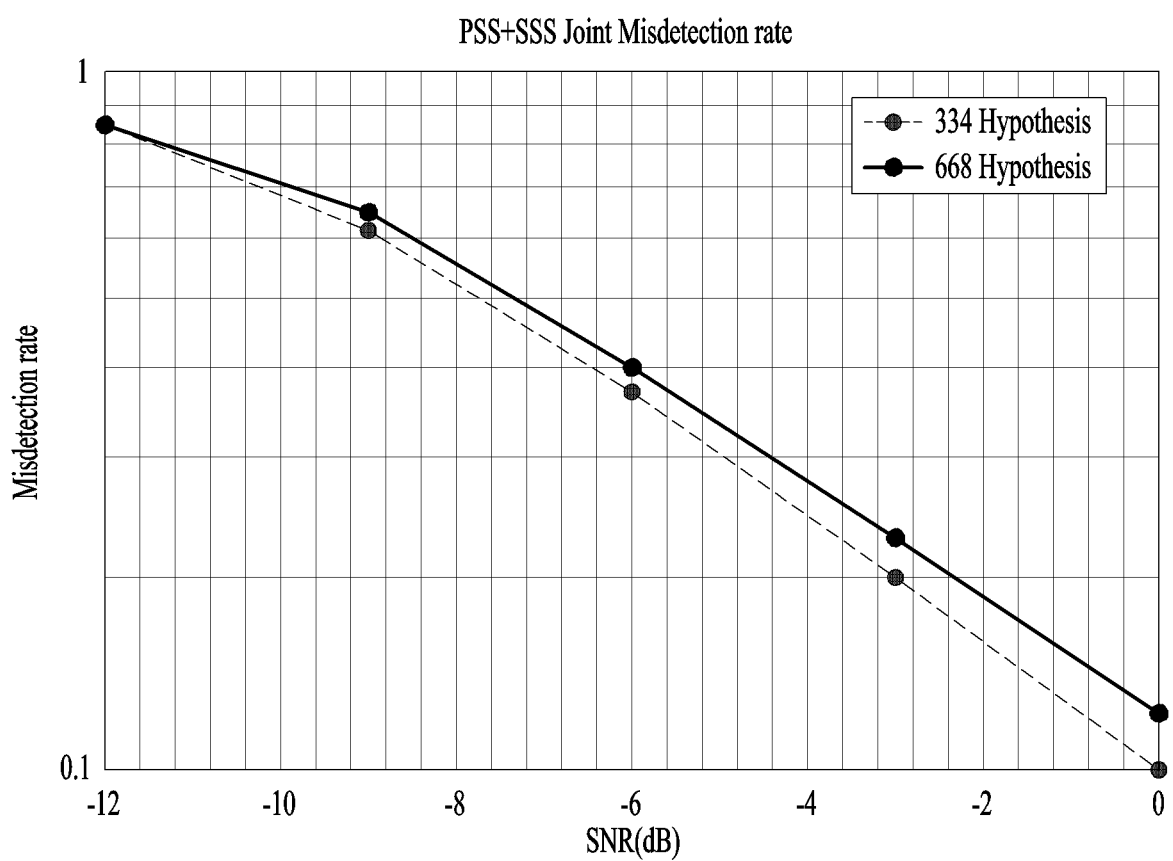

Referring to FIG. 16, although the hypotheses of the NR-SSS sequence increase two times, special performance degradation is not observed. Hence, in order to detect a boundary of an SS burst set within a default period, it is able to consider introduction of an additional set of NR-SSS.

Meanwhile, according to FIGS. 14 to 16, parameters used for the measurement test are shown in Table 2.

TABLE 2

| Parameter | Value |
|---|---|
| Carrier Frequency | 4 GHz |
| Channel Model | CDL_C (delay scaling values: 100 ns) |
| Subcarrier Spacing | 15 kHz |
| Antenna Configuration | TRP: (1, 1, 2) with Omni-directional antenna element |
| | UE: (1, 1, 2) with Omni-directional antenna element |
| Timing offset | Uniformly distributed in [−1 ms, 1 ms] |
| Frequency Offset | 5 ppm |
| PSS/SSS detection | One shot detection |
| PSS/SSS period | 20 ms |
| Subframe duration | 1 ms |
| OFDM symbols in SF | 14 |
| Number of interfering TRPs | 2 |
| Operating SNR | −6 dB |

<M-Sequence Providing Low PAPR and NR-PSS Sequence Set Using the Same>

As described above, the previously proposed M-sequence based PSS provides good correlation property despite that a large frequency offset exists, whereby time estimation precision can be raised advantageously. On the contrary, an OFDM symbol generated from mapping an M-sequence to a frequency domain has a disadvantage that its PAPR is raised. The M-sequence can generate various sequences according to a polynomial, a cyclic shift and an initial value. The generated sequences show different PAPR properties, respectively.

Therefore, the present invention proposes an M-sequence providing low PAPR and an NR-PSS sequence set using the same.

If 3 is selected by a method of picking a cyclic shift having the lowest PAPR in a sequence having low PAPR, [95, 104, 106] is selected. Yet, since a value of a frequency offset is 5~20 ppm that is considerably large in an initial access step, inter-subcarrier interference may be caused correspondingly. Therefore, to prevent such interference, it is preferable that a sequence is mapped with at least 3 or 4 subcarrier spacings. Since an M-sequence generated according to a cyclic shift is mapped to a subcarrier with an interval amounting to the cyclic shift, it may bring an effect of selecting M-sequences having a cyclic shift of about 3~4.

Figure 17:
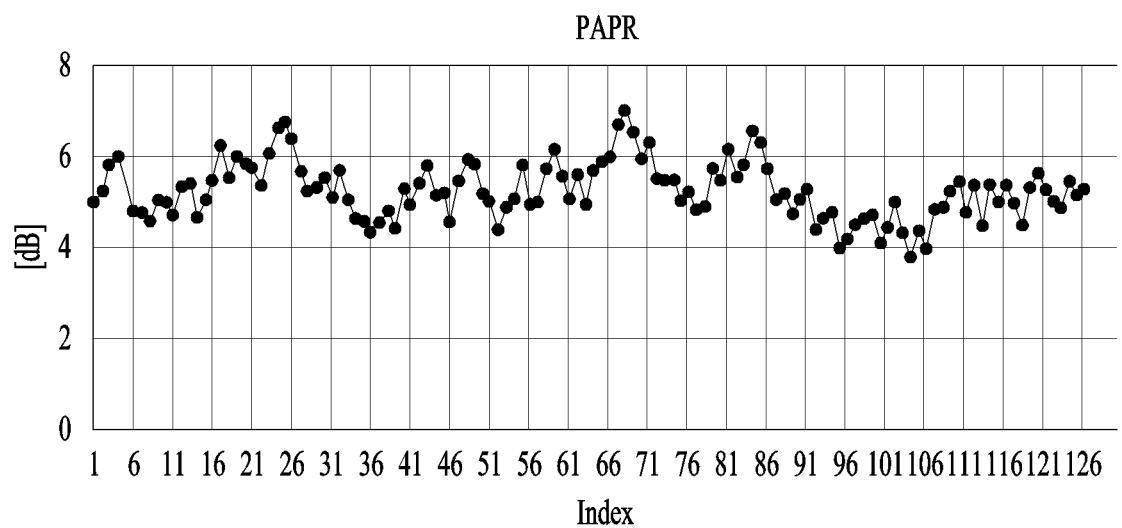

FIG. 17 shows a result value of measuring PAPR of M-sequence. Referring to FIG. 17, according to the aforementioned rule, it is able to select an M-sequence having low PAPR. And, Table 3 in the following shows PAPR of an M-sequence generated on the assumption of an initial value (1110110) for the polynomial $(x^7+x^4+1)$.

TABLE 3

| Polynomial | CS | PAPR [dB] | CM [dB] |
|---|---|---|---|
| $x^7 + x^4 + 1$ (WA) | [0, 43, 86] | [5.79, 5.82, 5.77] | [1.12, 1.35, 1.43] |
| $x^7 + x^4 + 1$ | [95, 104, 106] | [4.05, 3.82, 3.98] | [0.91, 0.62, 0.64] |
| $x^7 + x^4 + 1$ | [95, 100, 104] | [4.04, 4.15, 3.82] | [0.91, 0.68, 0.62] |
| $x^7 + x^4 + 1$ | [8, 52, 104] | [4.62, 4.43, 3.82] | [1.04, 0.85, 0.62] |
| $x^7 + x^4 + 1$ | [36, 95, 106] | [4.39, 4.04, 3.98] | [1.09, 0.91, 0.64] |
| $x^7 + x^4 + 1$ | | | |

Meanwhile, Table 4 lists a Cyclic Shift (CS) of which PAPR has a value lower than 4.5 dB. From the result of Table 4, a CS having a CS spacing equal to or greater than at least 3 is selected. And, the selected CS may be usable in configuring NR-PSS.

TABLE 4

| CS | CM | PAPR |
|---|---|---|
| 36 | 1.090726 | 4.390783 |
| 39 | 1.085564 | 4.458993 |
| 52 | 0.854161 | 4.436837 |
| 92 | 1.062999 | 4.481192 |
| 95 | 0.918112 | 4.049291 |
| 96 | 0.771861 | 4.227203 |
| 100 | 0.687071 | 4.157915 |
| 101 | 0.617222 | 4.456263 |
| 103 | 0.6813 | 4.340628 |
| 104 | 0.629084 | 3.825493 |
| 105 | 0.661089 | 4.368873 |
| 106 | 0.644417 | 3.978043 |

Moreover, Table 5 shows CS sets according to various polynomials.

TABLE 5

| Polynomial | CS | PAPR [dB] | CM [dB] |
|---|---|---|---|
| $x^7 + x^6 + 1$ | [7, 27, 103] | [4.13, 4.33, 4.29] | [0.70, 1.17, 1.04] |
| $x^7 + x^6 + x^5 + x^4 + 1$ | [11, 42, 120] | [4.48, 4.24, 4.20] | [1.01, 1.05, 0.81] |
| $x^7 + x^5 + x^4 + x^3 + 1$ | [13, 38, 54] | [4.36, 4.20, 4.49] | [1.08, 0.89, 1.15] |
| $x^7 + x^5 + x^3 + x + 1$ | [43, 89, 104] | [4.49, 4.53, 4.29] | [1.19, 0.99, 0.85] |
| $x^7 + x^6 + x^4 + x + 1$ | [68, 90, 106] | [4.33, 4.22, 4.11] | [0.93, 0.67, 1.11] |
| $x^7 + x^5 + x^2 + x + 1$ | [23, 88, 125] | [4.39, 4.27, 4.41] | [1.10, 1.00, 1.01] |
| $x^7 + x^6 + x^5 + x^3 + x^2 + x + 1$ | [7, 22, 112] | [4.34, 4.52, 4.23] | [1.04, 1.17, 0.82] |
| $x^7 + x^6 + x^5 + x^4 + x^3 + x^2 + 1$ | [28, 81, 106] | [4.21, 4.17, 4.41] | [1.23, 0.92, 1.04] |

According to the measurement results of Tables 3 to 5, as shown in Table 6, the present invention proposes an NR-PSS polynomial and PAPR. In this case, assume that an initial value of a polynomial is [1011110].

TABLE 6

| Polynomial | CS | PAPR [dB] | CM [dB] |
|---|---|---|---|
| $x^7 + x^4 + 1$ | [0, 43, 86] | [4.67, 4.84, 5.67] | [1.22, 1.24, 1.53] |

<NR-PSS Detecting Process from UE's Perspective>

AN NR-PSS detecting process from UE's perspectvie is described with reference to FIG. 18 as follows. Meanwhile, a sequence described in FIG. 18 may include a sequence having 4 concatenated ZC sequences or a zero appended M-sequence.

First Detecting Process

Figure 18:
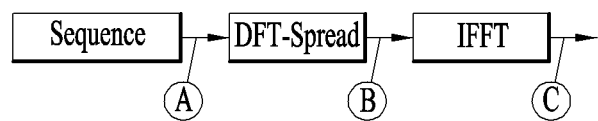
FIG. 18 is a diagram to describe a method of detecting a synchronization signal sequence at a user equipment side according to an embodiment of the present invention.

By performing full correlation using a sequence of a point A or a point C shown in FIG. 18, NR-PSS is detected. In doing so, the sequence of the point A or C may be usable in a manner of being generated from every detecting process or in a manner of being stored in a memory and then loaded.

Second Detecting Process

1) If a sequence shown in FIG. 18 is a sequence having 4 concatenated ZC sequences, NR-PSS is detected by performing partial correlation on S1 in a sequence of a point A or a point C. Here, the partial correlation is usable if S1 and S2 have conjugate complex relation and S3 and S4 are repetitions of S1 and S2. In doing so, the sequence of the point A or C may be usable in a manner of being generated on every detecting process or in a manner of being stored in a memory and then loaded.

2) If a sequence shown in FIG. 18 is an M-sequence, NR-PSS is detected by performing partial correlation using a half of a sequence length of a point A or a point C. The partial correlation is possible if NR-PSS is mapped according to the interleaved type. In doing so, the sequence of the point A or C may be usable in a manner of being generated from every detecting process or in a manner of being stored in a memory and then loaded.

Third Detecting Process

By performing correlation in a frequency domain using a sequence of a point B, NR-PSS is detected. If correlation with FFT of a signal having entered a buffer is found and then IFFT is performed, it is able to obtain the same result of 'the first detecting process'. In doing so, the sequence of the point B may be usable in a manner of being generated on every detecting process or in a manner of being stored in a memory and then loaded.

Figure 19:
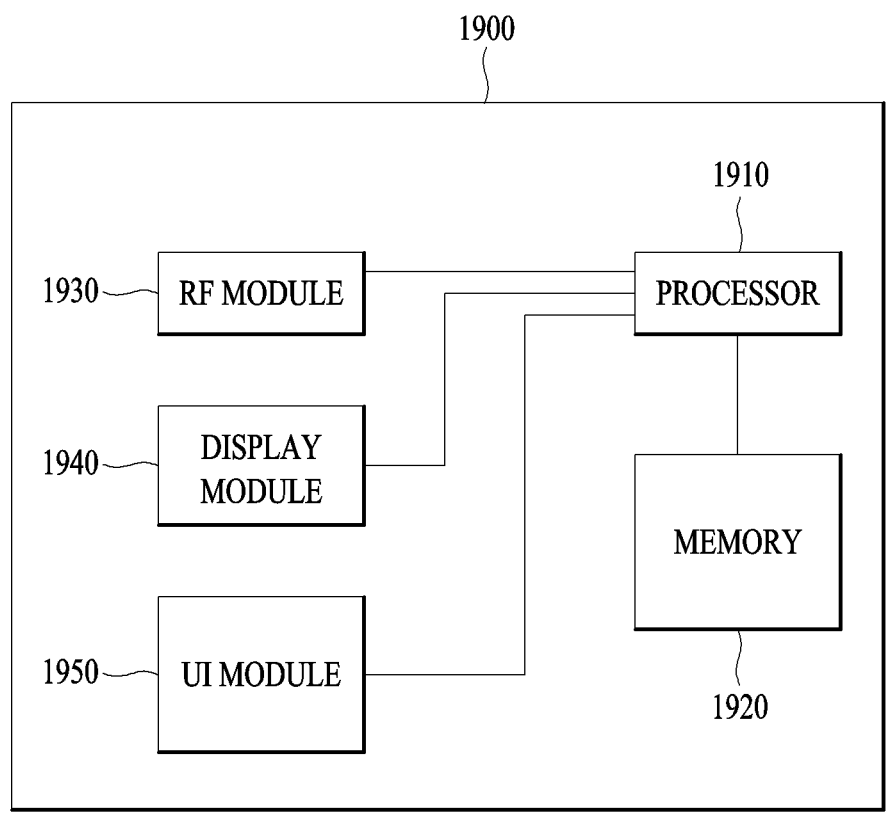
FIG. 19 is a block diagram of a communication apparatus according to an embodiment of the present disclosure.

Referring to FIG. 19, a communication apparatus 1900 includes a processor 1910, a memory 1920, an RF module 1930, a display module 1940, and a User Interface (UI) module 1950.

The communication device 1900 is shown as having the configuration illustrated in FIG. 19, for the convenience of description. Some modules may be added to or omitted from the communication apparatus 1900. In addition, a module of the communication apparatus 1900 may be divided into more modules. The processor 1910 is configured to perform operations according to the embodiments of the present disclosure described before with reference to the drawings. Specifically, for detailed operations of the processor 6010, the descriptions of FIGS. 1 to 18 may be referred to.

The memory 1920 is connected to the processor 1910 and stores an Operating System (OS), applications, program codes, data, etc. The RF module 1930, which is connected to the processor 1910, upconverts a baseband signal to an RF signal or downconverts an RF signal to a baseband signal. For this purpose, the RF module 1930 performs digital-to-analog conversion, amplification, filtering, and frequency upconversion or performs these processes reversely. The display module 1940 is connected to the processor 1910 and displays various types of information. The display module 1940 may be configured as, not limited to, a known component such as a Liquid Crystal Display (LCD), a Light Emitting Diode (LED) display, and an Organic Light Emitting Diode (OLED) display. The UI module 1950 is connected to the processor 1910 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

Although the above-described method of transmitting a synchronization signal in a wireless communication system and apparatus therefor are described by focusing on an example of being applied to the 5G NewRAT system, they are applicable to various kinds of wireless communication systems as well as to the 5G NewRAT system.

What is claimed is:

1. A method of transmitting a Synchronization Signal (SS) by a base station (BS) in a wireless communication system, the method comprising:
dividing an Orthogonal Frequency Division Multiplexing (OFDM) symbol into 4 time durations;
generating 4 first sequences for a Primary Synchronization Signal (PSS),
wherein the each of the 4 first sequences is different from each other, and wherein the each of the 4 first sequences has a different root index from each other,
wherein a length of each of the 4 first sequences is N, N is positive integer;
generating 4 second sequences, each having a length of (N+1), by copying a last element of the each of the 4 first sequences to a beginning of the each of the 4 first sequences;
mapping each of the 4 second sequences to each of the 4 time durations;
generating a third sequence of Secondary Synchronization Signal (SSS) based on a first M-sequence and a second M-sequence,
wherein the third sequence of the SSS is determined by multiplying the first M-sequence and the second M-sequence,
wherein the first M-sequence is determined based on $(1-2x_0((n+m_0) \bmod 127))$ and the second M-sequence is determined based on $(1-2x_1((n+m_1) \bmod 127))$,
wherein $m_0$ is determined based on floor(NID1/112) and $m_1$ is determined based on (NID1/112),
wherein 112 sequences can be generated based on the second M-sequence and 3 sequences can be generated based on the first M-sequence,
wherein a length of the third sequence is 127,
wherein the SSS is used for distinguishing more than 1000 Cells,
wherein 7 initial values of the first M-sequence and the second M-sequence are predetermined and 1 initial value of the 7 initial values is '1' and remaining 6 initial values of the 7 initial values are '0', and
transmitting the SS including (i) the 4 second sequences for the PSS and (ii) the third sequence for the SSS via the 4 time durations,
performing an initial access with a user equipment (UE) based on the SS,
wherein the SS is transmitted based on a periodicity of 20 ms,
wherein 4 subcarrier spacings (SCSs) are used for the SS, and the 4 SCSs are 15 kHz SCS, 30 kHz SCS, 120 kHz SCS and 240 kHz SCS,
wherein the 15 kHz SCS and 30 kHz SCS are used for a first frequency range and the 120 kHz SCS and 240 kHz SCS are used for a second frequency range,
wherein the second frequency range is higher than the first frequency range,
wherein a Cyclic Prefix (CP) is present before a foremost time duration of the 4 time durations in the OFDM symbol, and wherein no CP is present before each of remaining time durations other than the foremost time duration of the 4 time durations in the OFDM symbol,
wherein the length of each of the 4 second sequences is scaled based on a size of synchronization bandwidth, and
wherein a cover code is applied to the 4 second sequences so that (i) a first of the 4 second sequences and a third of the 4 second sequences have a complex conjugate relationship and (ii) a second of the 4 second sequences and a fourth of the 4 second sequences have a complex conjugate relationship.

2. The method of claim 1, wherein the each of the 4 second sequences is mapped to subcarriers with an interval which is equal to the 4 time durations.

3. The method of claim 1, wherein the each of the 4 second sequences has a length amounting to a half of a number of subcarriers included in the each of the 4 time durations, is mapped to an even subcarrier, and processes a DC subcarrier by nulling.

4. The method of claim 1, wherein the each of the 4 second sequences has a length amounting to a half of a number of subcarriers included in the each of the 4 time durations and is mapped to an even subcarrier in a manner of skipping a DC subcarrier.

5. A base station (BS) configured to transmit a Synchronization Signal (SS) in a wireless communication system, the base station comprising:
an RF module configured to transceive a wireless signal; and
a processor configured to:
divide an Orthogonal Frequency Division Multiplexing (OFDM) symbol into 4 time durations;
generate 4 first sequences for a Primary Synchronization Signal (PSS),
wherein the each of the 4 first sequences is different from each other, and wherein the each of the 4 first sequences has a different root index from each other,
wherein a length of each of the 4 first sequences is N, N is positive integer;
generate 4 second sequences, each having a length of (N+1), by copying a last element of the each of the 4 first sequences to a beginning of the each of the 4 first sequences;
map each of the 4 second sequences to each of the 4 time durations;
generate a third sequence of Secondary Synchronization Signal (SSS) based on a first M-sequence and a second M-sequence,
wherein the third sequence of the SSS is determined by multiplying the first M-sequence and the second M-sequence,
wherein the first M-sequence is determined based on $(1-2x_0((n+m_0) \bmod 127))$ and the second M-sequence is determined based on $(1-2x_1((n+m_1) \bmod 127))$,
wherein $m_0$ is determined based on floor(NID1/112) and $m_1$ is determined based on (NID1/112),
wherein 112 sequences can be generated based on the second M-sequence and 3 sequences can be generated based on the first M-sequence,
wherein a length of the third sequence is 127,
wherein the SSS is used for distinguishing more than 1000 Cells,
wherein 7 initial values of the first M-sequence and the second M-sequence are predetermined and 1 initial value of the 7 initial values is '1' and remaining 6 initial values of the 7 initial values are '0', and
transmit the SS including (i) the 4 second sequences for the PSS and (ii) the third sequence for the SSS via the 4 time durations,
performing an initial access with a user equipment (UE) based on the SS, wherein the SS is transmitted based on a periodicity of 20 ms, wherein 4 subcarrier spacings (SCSs) are used for the SS, and the 4 SCSs are 15 kHz SCS, 30 kHz SCS, 120 kHz SCS and 240 kHz SCS, wherein the 15 kHz SCS and 30 kHz SCS are used for a first frequency range and the 120 kHz SCS and 240 kHz SCS are used for a second frequency range, wherein the second frequency range is higher than the first frequency range, wherein a Cyclic Prefix (CP) is present before a foremost time duration of the 4 time durations in the OFDM symbol, and wherein no CP is present before each of remaining time durations other than the foremost time duration of the 4 time durations in the OFDM symbol, wherein the length of each of the 4 second sequences is scaled based on a size of synchronization bandwidth, and wherein a cover code is applied to the 4 second sequences so that (i) a first of the 4 second sequences and a third of the 4 second sequences have a complex conjugate relationship and (ii) a second of the 4 second sequences and a fourth of the 4 second sequences have a complex conjugate relationship.

6. A method of receiving a Synchronization Signal (SS) by a user equipment (UE) in a wireless communication system, the method comprising:

receiving, from a base station (BS) the SS including (i) a Primary Synchronization Signal (PSS) configured with 4 first sequences mapped to an Orthogonal Frequency Division Multiplexing (OFDM) symbol, and (ii) a Secondary Synchronization Signal (SSS) configured with a third sequence, wherein the SS is transmitted based on a periodicity of 20 ms, wherein 4 subcarrier spacings (SCSs) are used for the SS, and the 4 SCSs are 15 kHz SCS, 30 kHz SCS, 120 kHz SCS and 240 kHz SCS, wherein the 15 kHz SCS and 30 kHz SCS are used for a first frequency range and the 120 kHz SCS and 240 kHz SCS are used for a second frequency range, wherein the second frequency range is higher than the first frequency range; and performing an initial access with the BS based on the SS;

wherein each of the 4 first sequences has a length of (N+1), N is positive integer, wherein the OFDM symbol is divided in to 4 time durations; and determining a cell group for the PSS based on the 4 first sequences, wherein the 4 first sequences are generated by copying a last element of each of 4 second sequences to a beginning of the each of the 4 second sequences, wherein the each of the 4 second sequences has a length of N, wherein each of the 4 first sequences is mapped to each of the 4 time durations, and wherein the each of the 4 second sequences is different from each other, and wherein the each of the 4 second sequences has a different root index from each other, wherein the third sequence of the SSS is generated based on a first M-sequence and a second M-sequence, wherein the third sequence of the SSS is determined by multiplying the first M-sequence and the second M-sequence, wherein the first M-sequence is determined based on $(1-2x_0((n+m_0) \bmod 127))$ and the second M-sequence is determined based on $(1-2x_1((n+m_1) \bmod 127))$, wherein $m_0$ is determined based on floor(NID1/112) and $m_1$ is determined based on (NID1/112), wherein 112 sequences can be generated based on the second M-sequence and 3 sequences can be generated based on the first M-sequence, wherein a length of the third sequence is 127, wherein the SSS is used for distinguishing more than 1000 Cells, wherein 7 initial values of the first M-sequence and the second M-sequence are predetermined and 1 initial value of the 7 initial values is '1' and remaining 6 initial values of the 7 initial values are '0', wherein a Cyclic Prefix (CP) is present before a foremost time duration of the 4 time durations in the OFDM symbol, and wherein no CP is present before each of remaining time durations other than the foremost time duration of the 4 time durations in the OFDM symbol, wherein the length of each of the 4 first sequences is scaled based on a size of synchronization bandwidth, and wherein a cover code is applied to the 4 second sequences so that (i) a first of the 4 second sequences and a third of the 4 second sequences have a complex conjugate relationship and (ii) a second of the 4 second sequences and a fourth of the 4 second sequences have a complex conjugate relationship.

* * * * *